(12) United States Patent
Betts-LaCroix et al.

(10) Patent No.: US 7,274,355 B2
(45) Date of Patent: Sep. 25, 2007

(54) BLENDED TRANSFER FUNCTION FOR COMPUTER POINTING DEVICES

(75) Inventors: Jonathan Betts-LaCroix, Chatsworth, CA (US); Michael Prichard, Oakland, CA (US)

(73) Assignee: OQO, Inc., San Francisco, CA (US)

( * ) Notice: Subject to any disclaimer, the term of this patent is extended or adjusted under 35 U.S.C. 154(b) by 682 days.

(21) Appl. No.: 10/831,758

(22) Filed: Apr. 23, 2004

(65) Prior Publication Data

US 2005/0024326 A1 Feb. 3, 2005

Related U.S. Application Data

(60) Provisional application No. 60/465,740, filed on Apr. 25, 2003.

(51) Int. Cl.
*G09G 5/08* (2006.01)
(52) U.S. Cl. .................................. 345/157; 345/163
(58) Field of Classification Search ......... 345/156–172
See application file for complete search history.

(56) References Cited

U.S. PATENT DOCUMENTS

| | | | |
|---|---|---|---|
| 5,012,231 A | | 4/1991 | Felsenstein |
| 5,191,641 A | | 3/1993 | Yamamoto et al. |
| 5,386,507 A | * | 1/1995 | Teig et al. .................. 715/836 |
| 5,570,111 A | | 10/1996 | Barrett et al. |
| 5,764,219 A | * | 6/1998 | Rutledge et al. ............ 345/159 |
| 7,046,229 B1 | * | 5/2006 | Drake ......................... 345/156 |
| 7,133,024 B2 | * | 11/2006 | Drake ......................... 345/157 |

FOREIGN PATENT DOCUMENTS

| | | |
|---|---|---|
| EP | 0706111 A2 | 10/1996 |
| EP | 0706111 B1 | 11/2001 |

OTHER PUBLICATIONS

Synaptics, Customer Support Downloads, Jul. 31, 2002, 4 Pgs, www.synaptics.com/support/downloads.cfm.
Synaptics, TouchStyk Product Brief, 2001, 2 Pgs, www.synaptics.com/pdf/touchStyk.pdf.
Synaptics, TouchPad Product Brief, 2001, 2 Pgs, www.synaptics.com/pdf/touchPad.pdf.
Anant Kartik Mithal, Using Psychomotor Models of Movement in the Analysis and Design of Copmuter Pointing Devices, May 7-11, 1995, 2 Pgs, http://www.acm.org/sigchi/chi95/Elect.

* cited by examiner

*Primary Examiner*—Richard Hjerpe
*Assistant Examiner*—Jean Lesperance
(74) *Attorney, Agent, or Firm*—Robert Plotkin, P.C.

(57) ABSTRACT

A transfer function is provided for use with computer pointing devices such as trackpads. The transfer function includes a first component having characteristics of a positional transfer function and a second component having characteristics of a velocity-based transfer function. The first (positional) component and the second (velocity-based) component of the transfer function are blended so that the transfer function exhibits purely positional behavior in response to a first range of inputs and exhibits combined positional and velocity-based behavior in response to a second range of inputs. The first range of inputs may, for example, correspond to a region in the input coordinate space that is bounded by a circle having a predetermined threshold radius.

54 Claims, 17 Drawing Sheets

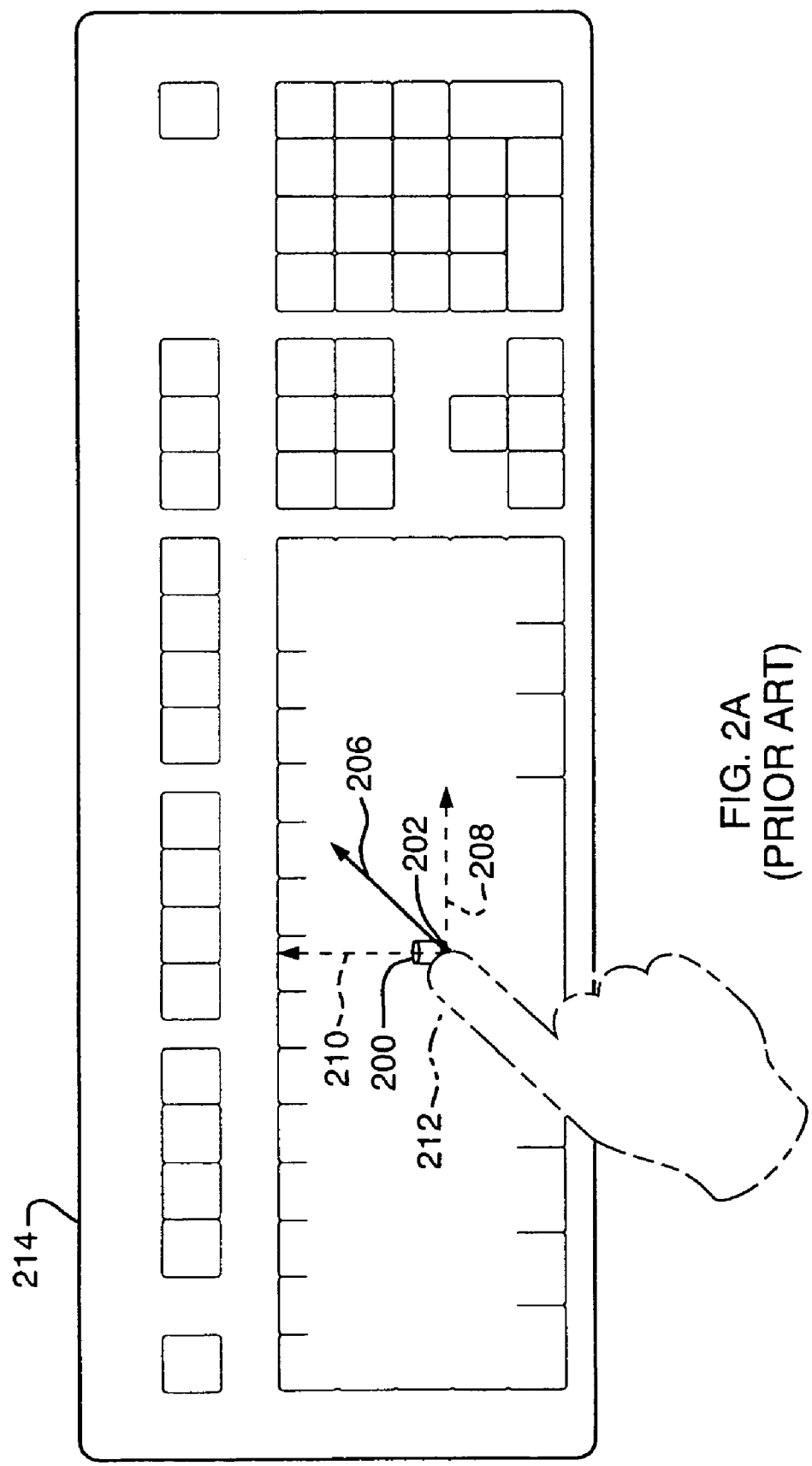

BLENDED TRANSFER FUNCTION FOR COMPUTER POINTING DEVICES

CROSS REFERENCE TO RELATED APPLICATIONS

This application claims priority from U.S. Provisional Patent Application Ser. No. 60/465,740, filed on Apr. 25, 2003, entitled "Blended Transfer Function for Computer Pointing Devices," which is hereby incorporated by reference.

BACKGROUND

1. Field of the Invention

The present invention relates to computer pointing devices and, more particularly, to transfer functions for use in conjunction with computer pointing devices.

2. Related Art

Conventional computing devices typically accept input from input devices such as a keyboard and/or a pointing device, such as a computer mouse. A typical computer mouse, which is shaped to fit underneath a user's cupped hand, may be moved laterally by the user over a flat surface (such as a mouse pad or a desktop), thereby causing corresponding changes in the coordinates of a pointer (such as an arrow icon) on the computer screen (referred to herein as an "on-screen pointer").

The input provided by a pointing device may be represented by an input vector having a magnitude and a direction. The input vector obtained from a mouse, for example, specifies both the distance and direction of the mouse's most recent movement. Software executing on the computer translates this input vector into an output vector specifying the distance and direction in which the on-screen pointer is to move. The output vector is generated from the input vector using a transfer function, which defines the relationship between input vectors generated by the mouse and corresponding output vectors. Transfer functions, such as those associated with computer mice, which relate input distance or coordinates to output distance or coordinates are referred to as "positional" transfer functions, and the devices that use them are referred to as "positional" pointing devices.

Trackpads, which are often used in laptop computers, are another example of a positional pointing device. A laptop trackpad typically includes a small and flat surface that is positioned just below the keyboard. Moving one's finger across the surface of a trackpad causes the on-screen pointer to move in a corresponding direction and by a corresponding distance that is proportional to the distance moved by the user's finger. In practice, the magnitude of the output vector is typically scaled upward so that the user may cause the on-screen pointer to move a relatively large distance by moving his finger only a small distance.

In contrast to positional pointing devices, pointing devices which relate input force to output (pointer) velocity are referred to as "velocity-based" pointing devices, and the transfer functions they use are referred to as "velocity-based" transfer functions. The IBM TrackPoint is one well-knowm example of a velocity-based pointing device. The TrackPoint includes a small nub typically nestled between the G, H, and B keys of a laptop computer. The user applies lateral force to the nub in the direction in which pointer movement is desired. Although the nub itself does not move perceptibly, it senses the direction and amount of force applied by the user's finger and causes the on-screen pointer to move in the same direction and with a velocity that is proportional to the magnitude of the applied force. The user may, therefore, speed up movement of the pointer by applying more force and slow down movement of the pointer by applying less force.

Conventional positional pointing devices are best used when fine-grained control over pointer position is required. To enable the pointer to be moved easily over large distances, however, a pointing device having a large range of movement is required. This can be problematic because a large range of movement requires either a large pointing device (as in the case of trackpads) or a large area within which to move the pointing device (as in the case of computer mice). It is therefore particularly difficult to implement positional pointing devices having a large range of movement for use with small, portable, computing devices such as laptop computers or personal digital assistants (PDAs).

Although velocity-based pointing devices may enable the user to move the pointer over a large distance without requiring a large range of movement, it typically is difficult to quickly position an on-screen pointer precisely using a velocity-based pointing device. Moving the pointer too quickly using a velocity-based pointing device may result in the pointer "over-shooting" the intended target. Although the pointer may be positioned more precisely by applying less force, thereby decreasing the pointer's velocity, using such a technique may significantly slow down the process of positioning the pointer at the desired coordinates.

What is needed, therefore, are pointing devices which provide flexible control over the position and/or velocity of an element such as an on-screen pointer.

SUMMARY

A transfer function is provided for use with computer pointing devices such as trackpads. The transfer function includes a first component having characteristics of a positional transfer function and a second component having characteristics of a velocity-based transfer function. The first (positional) component and the second (velocity-based) component of the transfer function are blended so that the transfer function exhibits purely positional behavior in response to a first range of inputs and exhibits combined positional and velocity-based behavior in response to a second range of inputs. The first range of inputs may, for example, correspond to a region in the input coordinate space that is bounded by a circle having a predetermined threshold radius.

For example, in one aspect of the present invention, a computer-implemented method is provided for use with a pointing device for providing input to a computing device. The method includes steps of: (A) receiving an input vector representing input coordinates relative to a center of an input coordinate space associated with the pointing device, the input coordinate space comprising a first region and a second region; (B) determining whether the input coordinates are within the first region of the input coordinate space; (C) selecting a first transfer function if the input coordinates are determined to be within the first region; (D) selecting a second transfer function if the input coordinates are determined not to be within the first region, the second transfer function comprising a non-constant function relating the input vector to velocity; and (E) selecting a position and velocity of an on-screen pointer based on the selected transfer function.

In another aspect of the present invention, a computer-implemented method is provided for use with a pointing device for providing input to a computing device. The method includes steps of: (A) receiving an input vector representing input coordinates relative to a center of an input coordinate space associated with the pointing device; (B) determining whether the input coordinates are within a first transition radius of the center of the input coordinate space; (C) selecting a first transfer function if the input coordinates are determined to be within the first transition radius of the center of the input coordinate space; (D) selecting a second transfer function if the input coordinates are determined not to be within the first transition radius of the center of the input coordinate space; and (E) selecting a position and velocity of an on-screen pointer based on the selected transfer function.

Other features and advantages of various aspects and embodiments of the present invention will become apparent from the following description and from the claims.

BRIEF DESCRIPTION OF THE DRAWINGS

FIG. 2A is a diagram illustrating force applied by a user's finger to a prior art TrackPoint® pointing device;

DETAILED DESCRIPTION

Figure 1A:
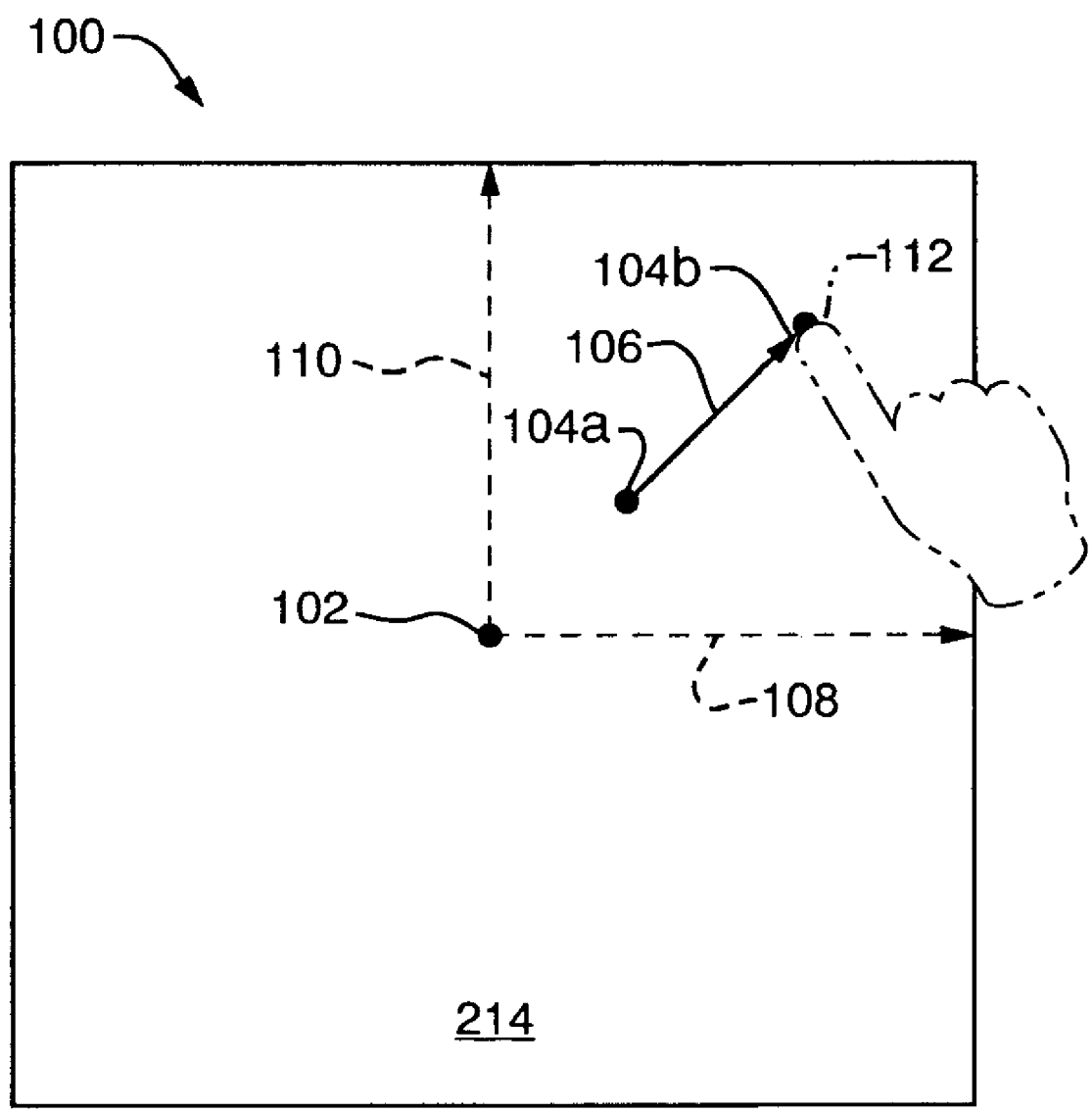
FIG. 1A is a diagram illustrating the movement of a user's finger across the surface of a first prior art trackpad pointing device.

Referring to FIG. 1A, a diagram is shown illustrating a first prior art trackpad pointing device 100. The device 100 includes a square and generally flat surface 214. Trackpads such as the trackpad 100 illustrated in FIG. 1 may typically be found in laptop computers. A user of the computer may cause on an on-screen pointer 606 (FIG. 6A) to move by moving his finger 112 across the surface 214 of the trackpad 100 in a desired direction and for a distance that corresponds to the distance to be traversed by the pointer 606.

For purposes of example, assume that the user places his finger 112 on the trackpad 100 at starting point 104a and moves it across the surface 114 to ending point 104b, at which point the user removes his finger 112 from the surface 114, thereby following input trajectory 106. The coordinates of starting point 104a and ending point 104b are typically measured with-respect to x axis 108 and y axis 110, each of which extends in the negative direction in addition to the positive directions illustrated in FIG. 1A.

Figure 6A:
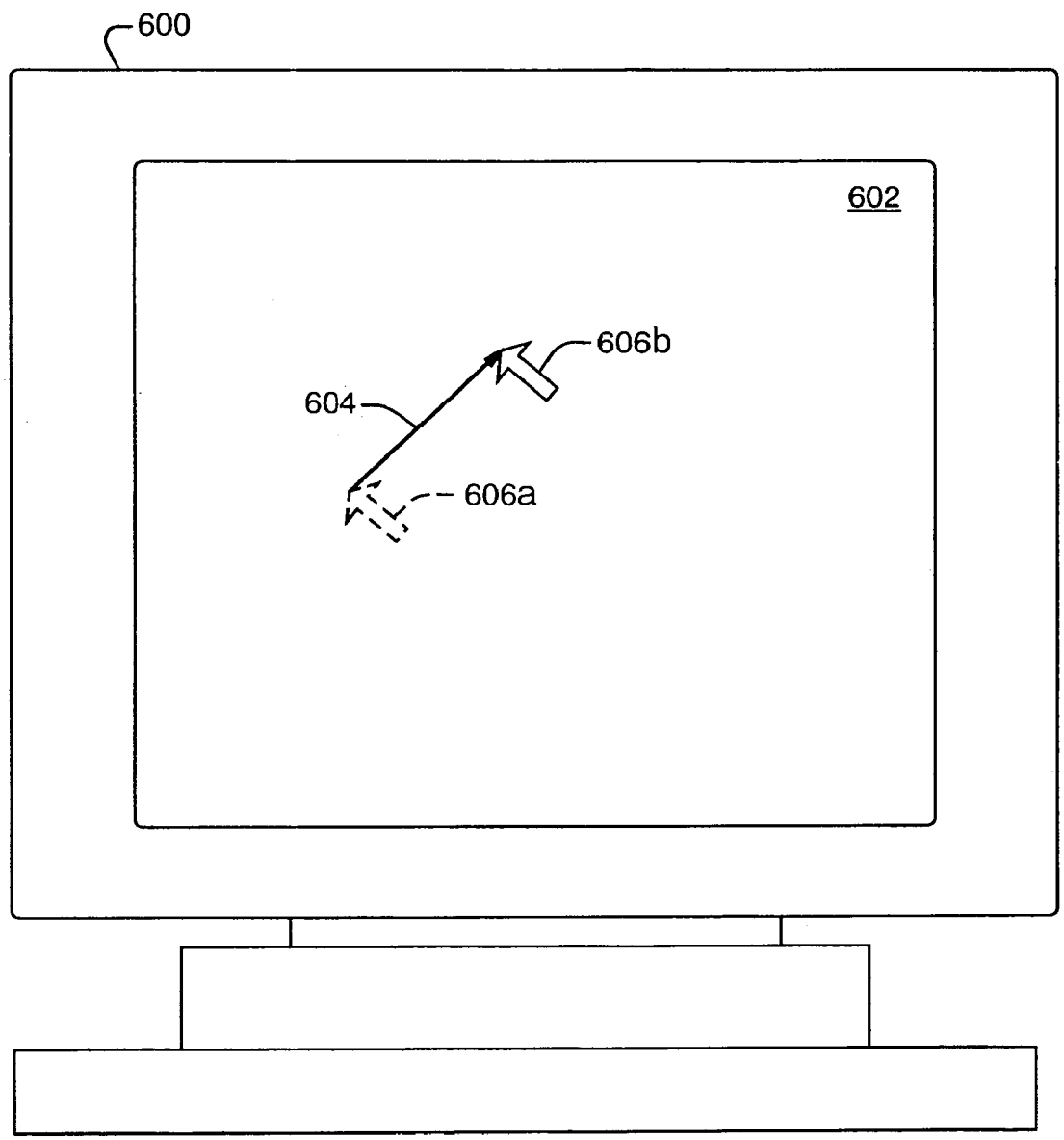
FIG. 6A is a diagram of the movement of an on-screen pointer across a computer monitor screen in response to the input provided by the user in FIG. 1A.

Referring to FIG. 6A, the movement of the user's finger 112 along input trajectory 106 causes a corresponding movement of the on-screen pointer 606 in the same direction as input trajectory 106 and scaled in magnitude by a positional gain. In the present example, the pointer 606 moves from starting location 606a to ending location 606b, thereby following output trajectory 604. Output trajectory 604 has the same direction as input trajectory 106. The magnitude of output trajectory 604, however, may be scaled by the positional gain with respect to the magnitude of the input trajectory 106. In this way, the user may cause the pointer 606 to move in a desired direction and by a desired distance by moving his finger 112 across the surface 114 appropriately. In particular, it is important to note that the on-screen pointer 606 only moves when the user's finger 112 moves; when the user's finger 112 is at rest on the surface 114, the on-screen pointer 606 is also at rest.

Figure 1B:
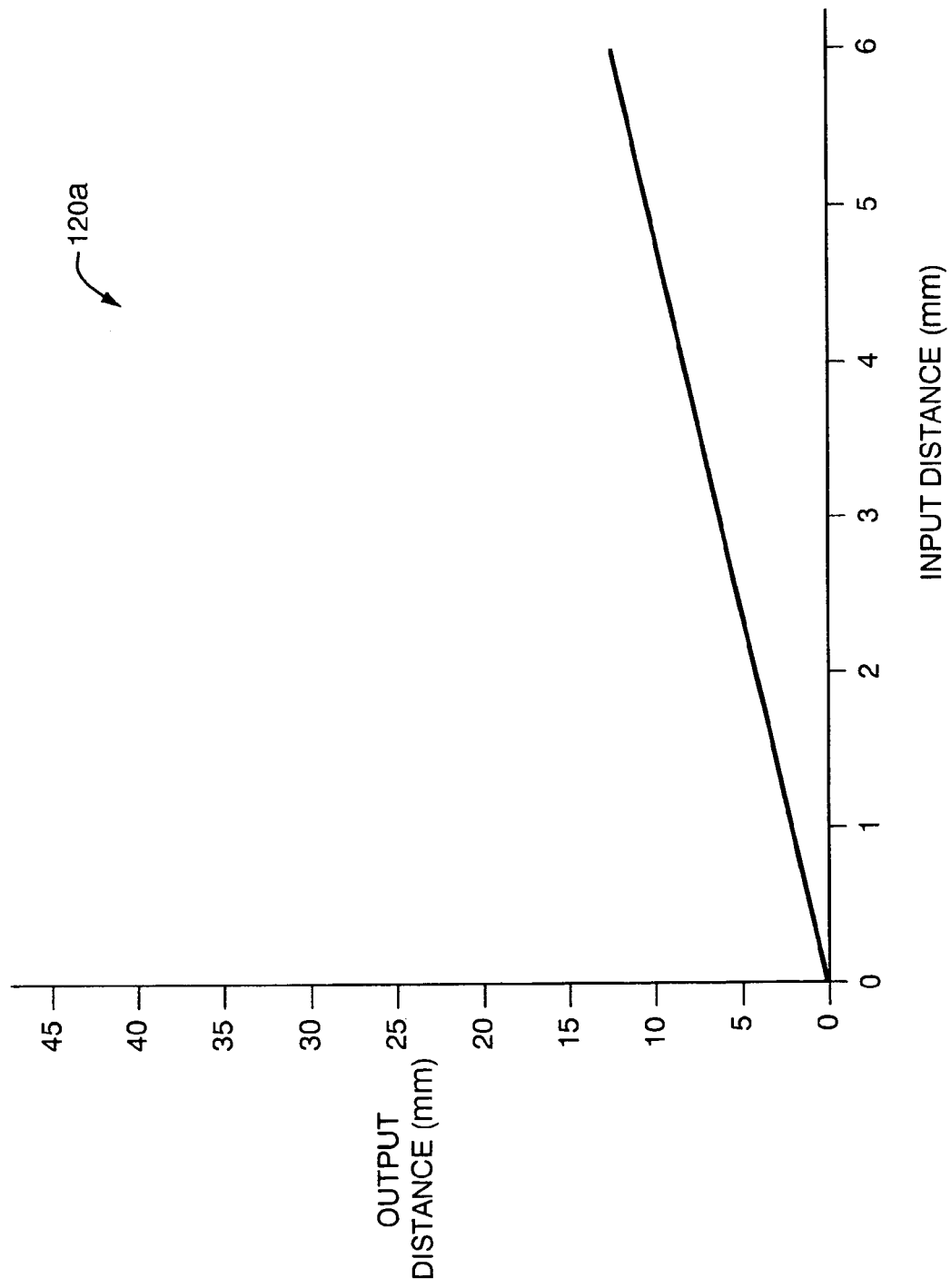
FIG. 1B is a graph of a prior art positional transfer function for use with the trackpad of FIG. 1A, expressed in terms of the relationship between input distance and output distance.

Referring to FIG. 1B, a graph 120a is shown of an example positional transfer function that may be used in conjunction with the trackpad device 100 of FIG. 1A to cause the on-screen pointer 606 to exhibit the behavior described above with respect to FIG. 6A. The horizontal axis of the graph 120a represents the input distance in millimeters (e.g., the length of the input trajectory 106, representing the distance moved by the user's finger 112 across surface 214 of trackpad 100). The vertical axis represents the length of the output trajectory 604, which is also referred to herein as the "output distance" because it is the distance moved by the on-screen pointer 606. According to the particular positional transfer function 120a illustrated in FIG. 1B, the transfer function f relating the output distance $d_o$ to the input distance $d_i$ may be expressed as $f(d_i)=2d_i$. In other words, the output pointer 606 moves two millimeters for every millimeter traversed by the user's finger 112.

Figure 1C:
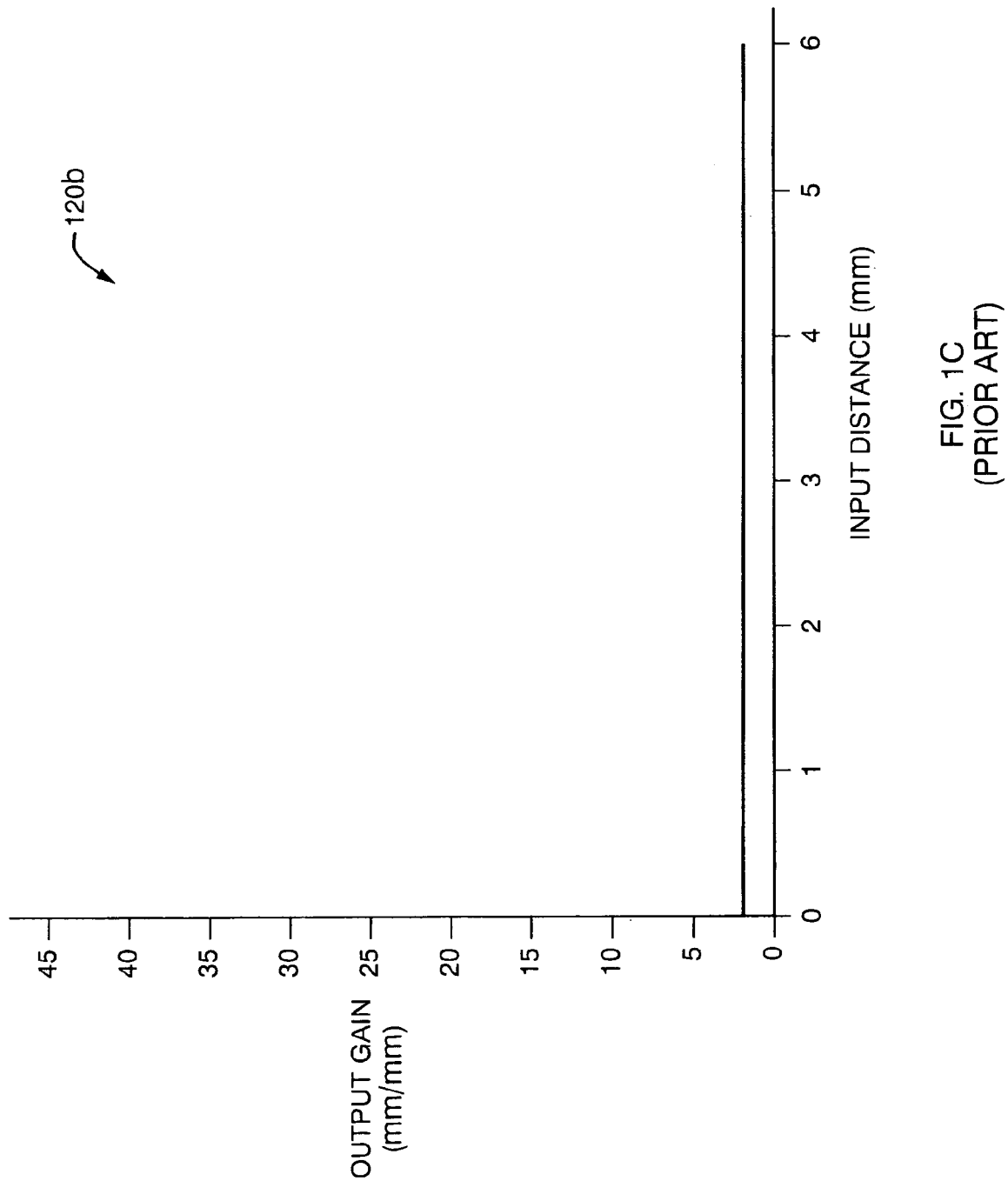
FIG. 1C is a graph of the positional transfer function of FIG. 1B expressed in terms of the relationship between input distance and output gain.

Referring to FIG. 1C, a graph 120b is shown which represents the same transfer function as that represented by graph 120a (FIG. 1B), except that the graph 120b in FIG. 1C relates the input distance $d_i$ to the output gain $v_o$ (e.g., the speed at which the on-screen pointer 606 travels). The vertical axis in FIG. 1C expresses the output gain $v_o$ in millimeters per millimeter (mm/mm). As shown in FIG. 1C, the output gain is a constant 2 mm/mm (equal to the positional gain) regardless of the input distance. In other words, the output gain $v_o$ of the pointer is always the same regardless of the input distance $d_i$. This characteristic is shared by and defines all purely positional transfer functions.

Referring to FIG. 2A, a diagram is shown illustrating a keyboard 214 including a conventional IBM TrackPoint® pointing device 200. The user may apply force to the tip of the pointing device 200 using finger 212, thereby generating input vector 206, which includes both the direction (measured along x axis 208 and y axis 210) and magnitude of the applied forceforce (typically measured in units of Newtons). The pointing device 200 itself does not move appreciably.

Figure 6B:
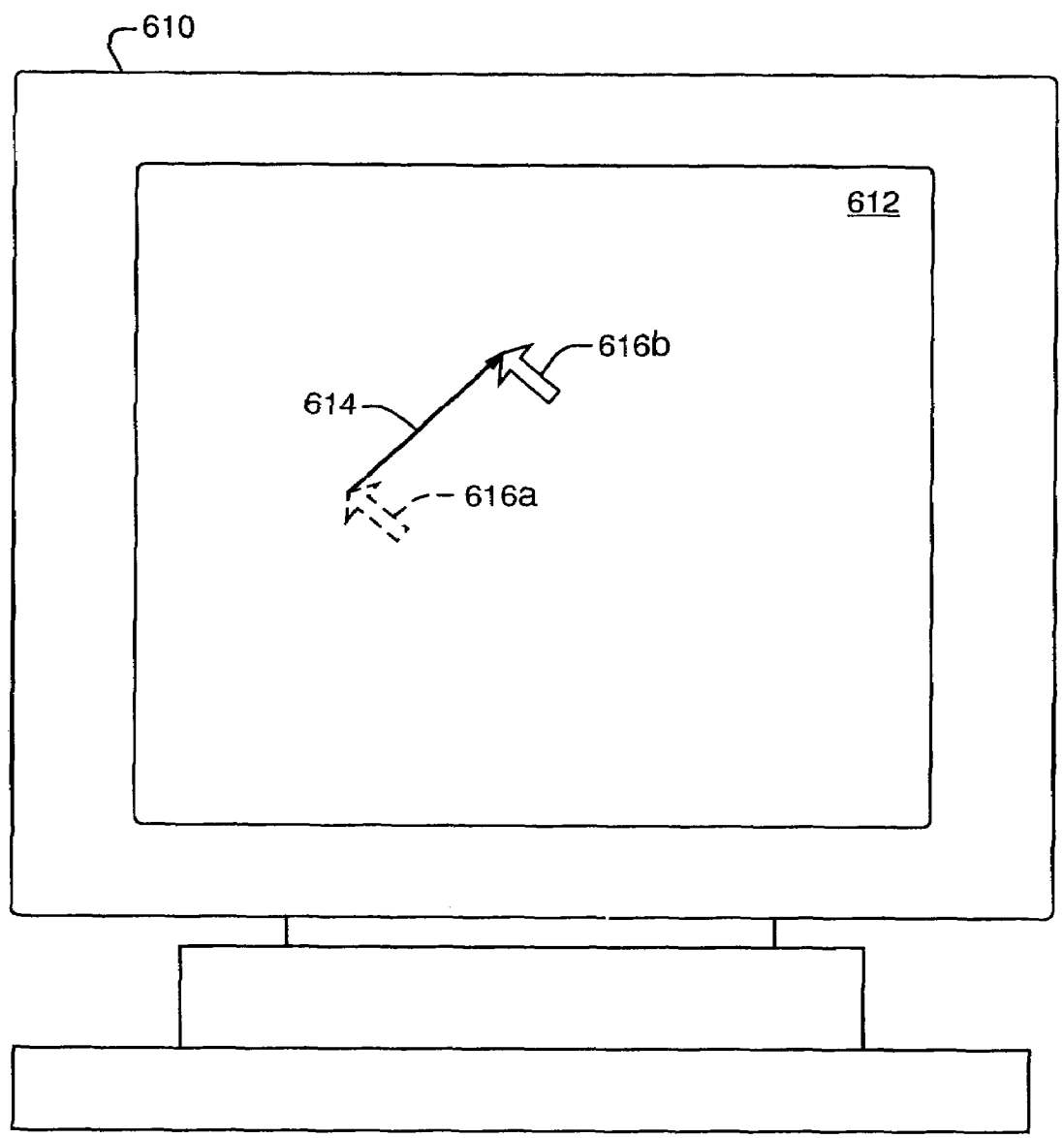
FIG. 6B is a diagram of the movement of an on-screen pointer across a computer monitor screen in response to the input provided by the user in FIG. 2A.

Referring to FIG. 6B, application of the input vector 206 to the pointing device 200 generates an output vector 614 which has the same direction as the input vector 206 and a velocity (referred to herein as the "output velocity") that is proportional to the magnitude of the input vector 206 (i.e., the input force). The pointer 616 moves in the direction of the output vector 614 at the output velocity only for so long as force is applied to the pointing device 200. The total distance traveled by the pointer 616 from point 616a to point 616b is therefore a function of both the output velocity and the amount of time that force is applied to the pointing device 200.

Figure 2B:
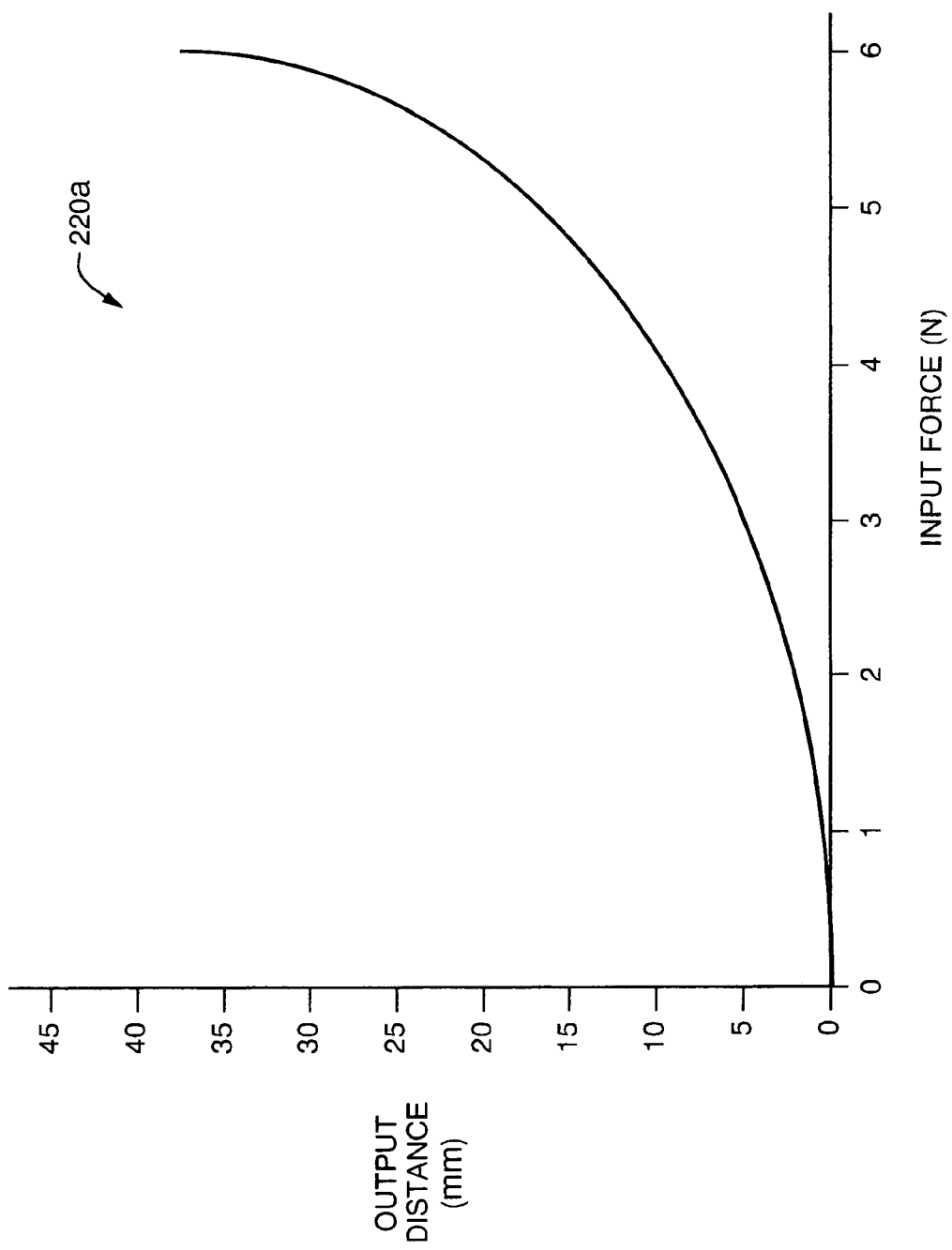
FIG. 2B is a graph of a first prior art velocity-based transfer function for use with the TrackPoint® pointing device of FIG. 2A, expressed in terms of the relationship between input force (measured in Newtons) and output distance.

Referring to FIG. 2B, a graph 220a is shown of an example velocity-based transfer function that may be used by the TrackPoint® pointing device of FIG. 2A to exhibit the behavior described above with respect to FIG. 6B. The horizontal axis of the graph 220a represents the magnitude of the input vector 206. (assumed to be held constant for some arbitrary, fixed period of time), referred to herein as the input force $p_i$, in Newtons and the vertical axis represents the output distance $d_o$ in millimeters over an arbitrarily chosen fixed time period. According to the particular transfer function illustrated in FIG. 2B, the transfer function f relating the output distance $d_o$ to the input force $p_i$ may be expressed as $f(p_i)=kp_i^2$, with appropriate unit conversions.

Figure 2C:
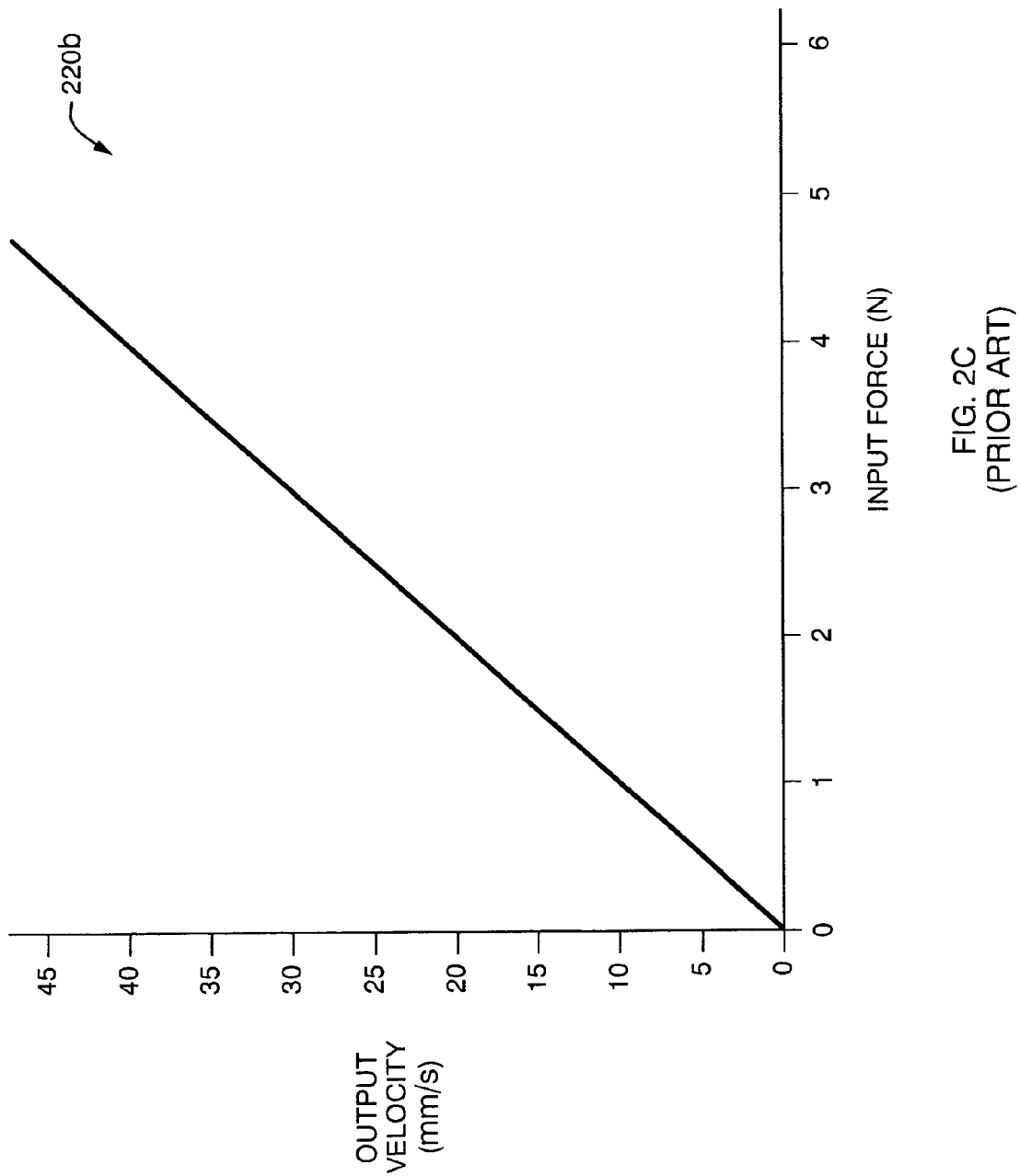
FIG. 2C is a graph of the velocity-based transfer function of FIG. 2B expressed in,terms of the relationship between input force and output velocity.

Referring to FIG. 2C, a graph 220b is shown which represents the same transfer function as graph 220a (FIG. 2B), except that the graph 220b in FIG. 2B relates the input force $p_i$ to the magnitude of the output vector 614, also referred to herein as the output velocity $v_o$. The vertical axis in FIG. 2C expresses the output velocity $v_o$ in millimeters per second (mm/s). As shown in FIG. 2C, the output velocity $v_o$ varies linearly with the input force $p_i$. In other words, the velocity of the pointer 616 increases in proportion to any increase in the input force $p_i$ and decreases in proportion to any decrease in the input force $p_i$. The user may therefore cause the pointer 616 to move more quickly by applying more force to the pointing device 200 and cause the pointer 616 to move less quickly by applying less force to the pointing device 200.

Figure 3A:
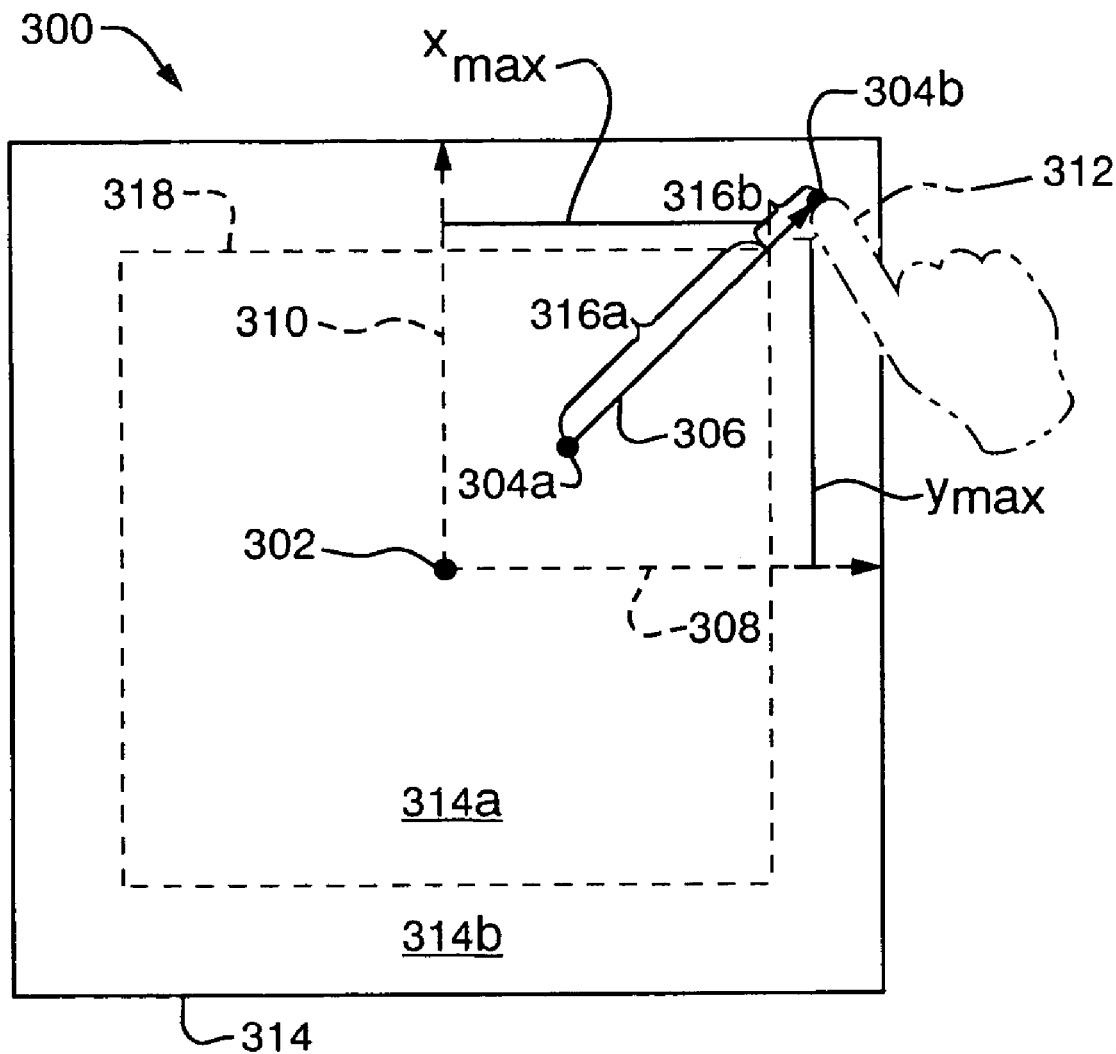
FIG. 3A is a diagram of the movement of a user's finger across the surface of a second prior art trackpad pointing device.

Referring to FIG. 3A, a diagram is shown illustrating a second prior art trackpad pointing device 300. The device 300 includes a square and generally flat surface 314. As with the first prior art trackpad 100 illustrated in FIG. 1A, a user may cause an on-screen pointer to move by moving his finger 312 across the surface 314 of the trackpad 300 in a desired direction.

The trackpad 300 includes two regions 314a and 314b which, in the present example, are both squares. Both regions. 314a and 314b are centered on the center 302 of the surface 314. First region 314a has a width of $2x_{max}$ and a height of $2y_{max}$. The corners of the outer boundary 318 of first region 314a therefore have coordinates $(x_{max}, y_{max})$, $(x_{max}, -y_{max})$, $(-x_{max}, -y_{max})$, and $(-x_{max}, y_{max})$, as measured with respect to x axis 308 and y axis 310. Second region 314b consists of the region of surface 314 that is outside of the outer boundary 318 of first region 314a.

For purposes of example, assume that the user places his finger 312 on the trackpad 300 at point 304a and moves it across the surface 314 to point 304b, at which point the user removes his finger 312 from the surface 314, thereby following input trajectory 306. Input trajectory 306 includes a first input trajectory 316a within the first region 314a and a second input trajectory 316b within the second region 314b. For purposes of simplifying the following explanation, the example input vector 306, if extended backwards, would intersect the center 302 of the surface 314.

Figure 3B:
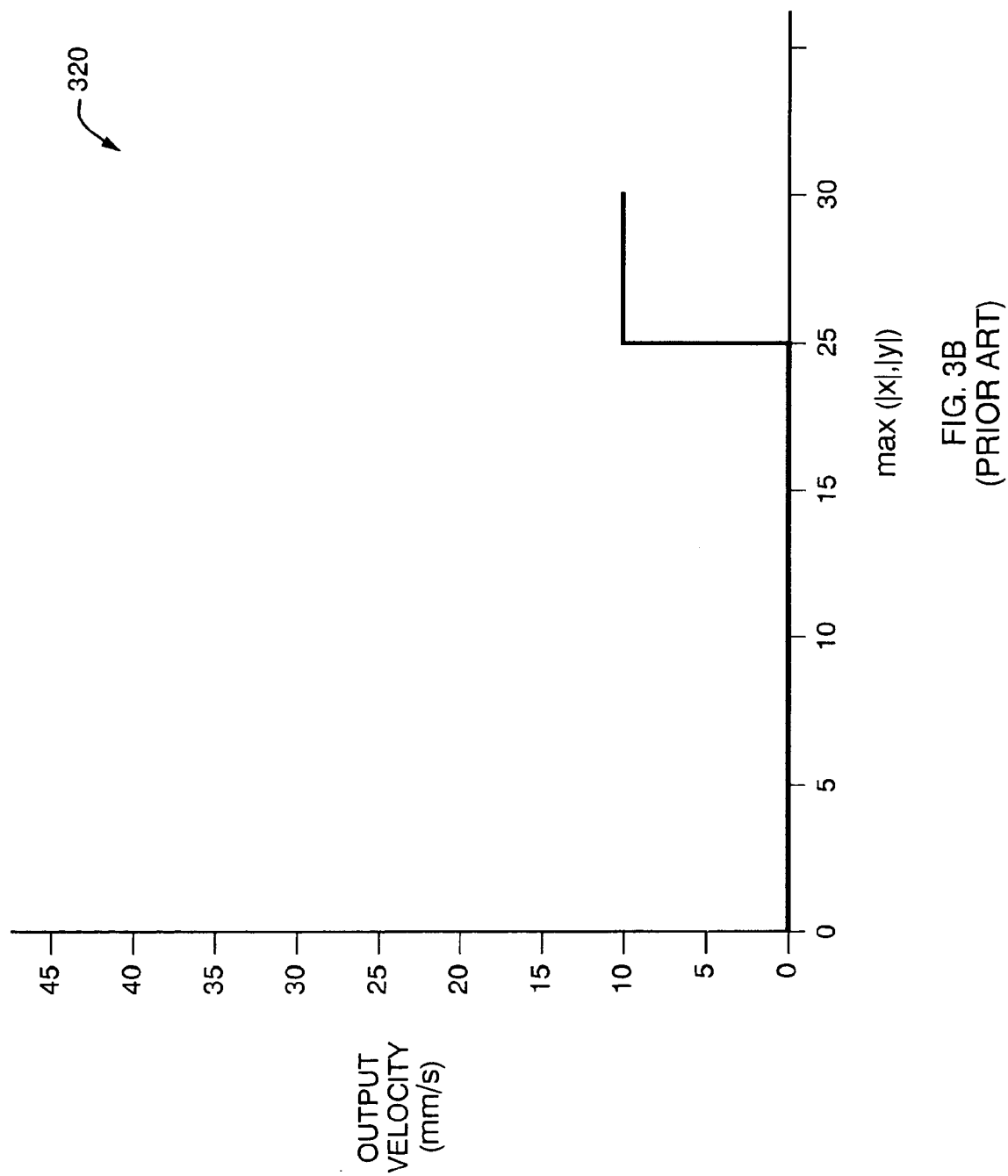
FIG. 3B is a graph of a second velocity-based transfer function for use with the trackpad of FIG. 3A, expressed in terms of the relationship between input distance and output velocity.

The trackpad 300 exhibits the behavior of a positional trackpad while the user's finger is within the first region 314a, and exhibits the behavior of a velocity-based trackpad having a constant velocity while the user's finger is within the second region 314b. Referring to FIG. 3B, for example, a graph 320 is shown of a transfer function that may be used in conjunction with the trackpad device 300 of FIG. 3A. The horizontal axis of the graph 320 represents the maximum of the absolute values of the x and y coordinates of the user's finger 312 on the surface 314 at any particular point in time. For example, if the coordinates of the user's finger are (3, −4), the value of max(|x|, |y|) is 4. The vertical axis represents the corresponding output velocity of the on-screen pointer, measured in mm/s.

Assume for purposes of example that both $x_{max}$ and $y_{max}$ are equal to 25 mm. Referring again to FIG. 3B, the graph 320 illustrates that the output velocity is zero when the input vector is held constant for an arbitrary fixed period of time. In this sense, the trackpad 300 exhibits the behavior of a positional trackpad when the user's finger 312 is within the first region 314a.

The graph 320 also illustrates that the output velocity is equal to a fixed non-zero value (10 mm/s in the present example) whenever the user's finger 312 is within the second region 314b (i.e., whenever either |x| or |y| is greater than or equal to 25 mm). In other words, placing the user's finger 312 in the second region 314b causes the on-screen pointer to move at a fixed velocity in a direction specified, for example, by a line segment connecting center 302 to the current point 304b at which the user's finger 312 contacts the surface 314. Moving the user's finger 312 within the second region 314b may cause the direction, but not the velocity, of the on-screen pointer to change. This feature of the trackpad 300 is typically provided to enable users to move the on-screen pointer across the screen in a particular direction without having to lift the finger 312 off of the trackpad 300 This feature is especially useful when the user's finger 312 cannot be removed from the trackpad 300, such as when the trackpad 300 is being used for combined click-drag operations.

Figure 4A:
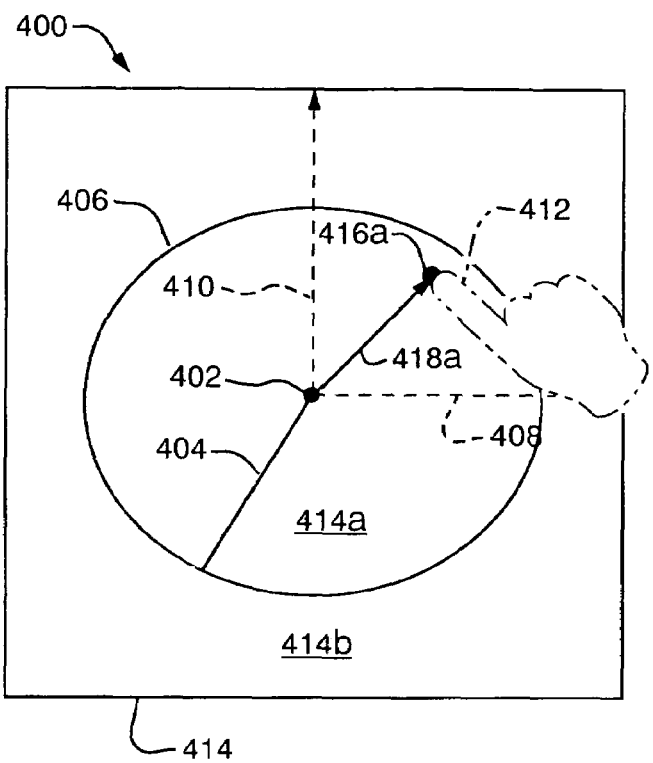
FIG. 4A is a diagram illustrating the surface of a pointing device and the contact of a user's finger on the surface within a transition radius of the center of the surface according to one embodiment of the present invention.

Referring to FIG. 4A, a pointing device 400 is shown according to a first embodiment of the present invention. The pointing device 400 is not limited to any particular physical embodiment. The pointing device 400 may, for example, incorporate physical features of a trackpad pointing device, a TrackPoint pointing device, or both.

For example, in one embodiment of the present invention, the pointing device 400 includes two pairs of differential, capacitive electrical resonators which serve as the measuring devices for the x and y axes of motion. A flexible material may, for example, be molded into an "L" shape having a raised bump at the knee of the "L". This shape may provide user control, centering springs for the two axes of motion, and capacitive dieletric pads to vary the capacitance of sensors on a printed circuit board underneath the molded material. As the user's finger slides the raised bump up, down, left, and right, the overlap between the dielectric pads and their corresponding capacitive sensors on the PCB causes the capacitance of each sensor to change. A resonating circuit on the PCB may be used to turn this into a voltage which can be encoded into an appropriate X or Y signal that is used to move the mouse cursor.

In another embodiment of the present invention, the pointing device 400 comprises a pointing device with small (+/−1–2 mm) motion based on the following principle of operation: a user's finger moves a flat button-like actuator in X and Y directions, which actuator contains a magnet. The motion of this magnet is sensed by two hall-effect sensors mounted directly to the system PC board which underlies the actuator. One hall-effect sensor effectively senses motion in the X direction, the other, Y, although there is some small amount of interference between the axes that is deconvolved using a function or table look-up. Spring return force is integrated into the button mounting design. The hall-effect outputs are read by the A/D input of a microprocessor and converted to an X,Y position vector.

For ease of illustration, the pointing device 400 is illustrated in generalized form in FIG. 4A without reference to its particular physical features. Rather, the pointing device 400 is illustrated in terms of an input coordinate space 414 having a center 402. The input coordinate space 414 may, for example, correspond to a rectangular surface of a trackpad pointing device, and the center 402 may correspond to the center of the trackpad's surface. More generally, the input coordinate space 414 represents the space of possible input vectors, and the center 402 represents the reference point that is used as the input vector origin.

In the description below, h is a vector (the "home vector") representing the current center of the positional range of the on-screen pointer. Each time the user initiates a pointing operation, the current coordinates of the pointer are assigned to the home vector h. The home vector h remains unchanged until the user terminates the current pointing operation and initiates another pointing operation, or until the home vector h is modified by Equation 4, as described below.

As used herein, the term "pointing operation" refers to a gesture or set of gestures that generates one or more consecutive non-zero input vectors to a pointing device. For example, in connection with a trackpad point device, a pointing operation is initiated when the user contacts the surface of the trackpad with his finger. The pointing operation continues for as long as the user's finger remains in contact with the surface, and terminates when the user removes his finger from the surface. In connection with a TrackPoint pointing device, a pointing operation is initiated when the user applies lateral force to the pointing device, continues for as long as the user applies lateral force to the pointing device, and terminates when the user stops applying lateral force to the pointing device.

Pointing device 400 includes two regions 414a and 414b. In the example illustrated in FIG. 4A, first region 414a is bounded by a circle 406 centered on center 402 and having a radius 404, also referred to as a "transition radius" for reasons that will be made clear below. Second region 414b includes the region of surface 414 that is outside of the first region 414a. Coordinates on surface 414 may be measured with reference to x axis 408 and y axis 410.

In the examples that follow, the pointing device 400 will be described as if it were a trackpad pointing device having an input surface that maps to the input coordinate space 414. It should be appreciated, however, that the same techniques may be applied to other kinds of pointing devices, such as TrackPoint pointing devices.

In FIG. 4A the user's finger 412 is illustrated at rest at a current position 416a. The endpoint 416a of an input vector 418a represents the position of the user's finger 412 relative to the center 402 of the surface 414. In the description below, r represents the input vector 418a. In the description below, p is a vector (the "position") representing the instantaneous position of the on-screen pointer.

The pointing device 400 exhibits the behavior of a positional pointing device when the endpoint 416a (e.g., the user's finger) is within the first region 414a and exhibits the behavior of a combination positional- and velocity-based pointing device when the endpoint 416a (e.g., the user's finger) is within the second region 414b.

Let kp (the "positional gain") be a constant controlling the gain of the positional transfer function (e.g., the first component 502a of the transfer function illustrated in FIG. 5, below). Assume for purposes of example that the value of kp is 2 mm/mm. Let kv (the "velocity gain") be a constant controlling the gain of the velocity transfer function. Assume for purposes of example that the value of kv is 10/s. Finally, let kr (the "transition radius") be a constant controlling the magnitude of r at which the velocity transfer function becomes non-zero. Assume for purposes of example that the value of kr is 2 mm.

Figure 5:
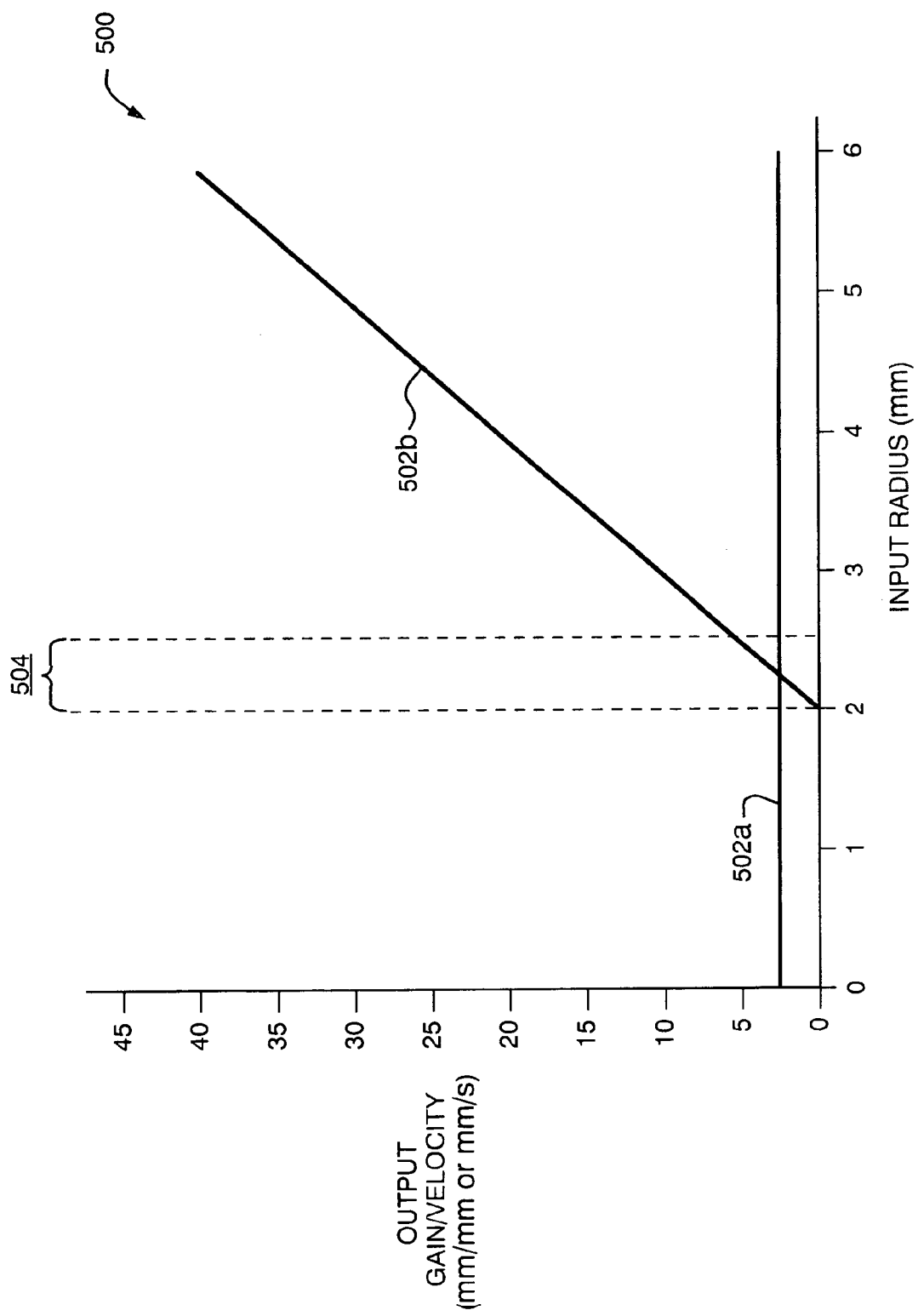
FIG. 5 is a graph of a first blended positional and velocity-based transfer function according to a first embodiment of the present invention, expressed in terms of the relationship between input radius and output velocity.

Referring to FIG. 5, for example, a graph 500 is shown of a transfer function according to a first embodiment of the present invention. The horizontal axis of the graph 500 represents the magnitude of the input vector r in millimeters. The vertical axis of graph 500 represents the output gain/velocity $v_o$ of the pointer. As described in more detail below, $v_o$ is measured in millimeters per millimeter (mm/mm) for a first component 502a of the transfer function, and in millimeters per second (mm/s) for a second component 502b of the transfer function.

More specifically, when $0<|r|<kr$ (i.e., when the endpoint 416a is within the first region 414a), the values of p and dh/dt are given by Equation 1 and Equation 2, respectively:

$$p=h+kp*r \qquad \text{Equation 1}$$

$$dh/dtb=0 \qquad \text{Equation 2}$$

Considering Equation 1, the instantaneous position p of the pointer may be calculated using an offset vector (kp*r) from the home vector h. The magnitude of the offset vector kp*r, therefore, is proportional to the magnitude of the input vector r. As indicated by Equation 2, the position of the home vector h remains constant over time while the input vector r remains within the first region 414a. The behavior represented by Equation 1 is therefore purely positional behavior.

In other words, the transfer function illustrated by graph 500 is a purely positional transfer function when the magnitude of the input radius r is less than the transition radius 504 (kr), which in this example is 2 millimeters. This is illustrated in FIG. 5 by the region of the graph 500 in which $0<|r|<kr$. In this region, the first component 502a has a constant gain of 2.5 mm/mm, while the second component 502b (representing the velocity dh/dt) has a constant velocity of 0 mm/s.

Although the second component 502b is described and illustrated herein as a straight line for purposes of simplicity, this is not a limitation of the present invention. Rather, the second component 502b may have any shape. For example, the second component 502b may begin rising slight from a value of zero and curve upward such that there is no bright-line transition radius. Alternatively, the second component 502b may, for example, curve strongly upward near the right-hand side of the graph 500 or flatten off near the right-hand side of the graph 500. Empirical user testing or other techniques may be used to select an appropriate shape for the second component 502b.

When $kr<|r|$ (i.e., when the endpoint 416a is within the second region 414b), the values of p and dh/dt are given by Equation 3 and Equation 4, respectively:

$$p=h+kp*r \qquad \text{Equation 3}$$

$$dh/dt=kv*r \qquad \text{Equation 4}$$

Note that Equation 3 is the same as Equation 1. According to Equation 4, the magnitude of the velocity dh/dt of the pointer is proportional to the magnitude of the input vector r. Therefore, when the endpoint 416a is in the second region 414b, the transfer function illustrated by graph 500 blends features of both positional and velocity-based transfer functions. The transfer function illustrated by graph 500 continues to behave in a positional manner with respect to changes in the input vector r (e.g., with respect to movement of the user's finger 412) within the second region 414b. The user may therefore continue to move the pointer in a positional manner when the endpoint 416a (e.g., the user's finger 412) is in second region 414b.

In addition, however, once the endpoint 416a (e.g., the user's finger 412) enters second region 414b, the transfer function illustrated by graph 500 also begins to behave in a velocity-based manner. In particular, the center of the positional range of the pointer, as represented by the home vector h, is incremented based on the input vector r and the velocity gain kv. Therefore, even if the the endpoint 416a is kept fixed at a particular point in second region 414b, the pointer will continue to move at a velocity whose magnitude is proportional to the magnitude of the input vector r.

Equation 3 and Equation 4, above, may be combined to form Equation 5, which gives the position p for $kr<|r|$:

$$p=\int kv*r*dt+kp*r \qquad \text{Equation 5}$$

This behavior is illustrated by the graph 500 in FIG. 5. Note, for example, that the second component 502b of the transfer function illustrated by graph 500 is the same as the velocity-based transfer function illustrated by graph 220b in FIG. 2C, except that the second component 502b is shifted by kr (2 mm) with respect to the graph 220b. Prior to a transition region 504 (bounded in FIG. 5 for purposes of example by a lower bound of 2 mm and an upper bound of 2.5 mm), the transfer function illustrated in FIG. 5 behaves like a purely positional transfer function. After the transition region 504, the second (velocity-based) component 502b dominates the first (positional) component 502a of the transfer function, making the transfer function act increasingly like a purely velocity-based transfer function as |r| increases. Within the transition region 504 the transfer function exhibits behavior that blends the properties of positional and velocity-based transfer functions roughly equally.

Figure 7:
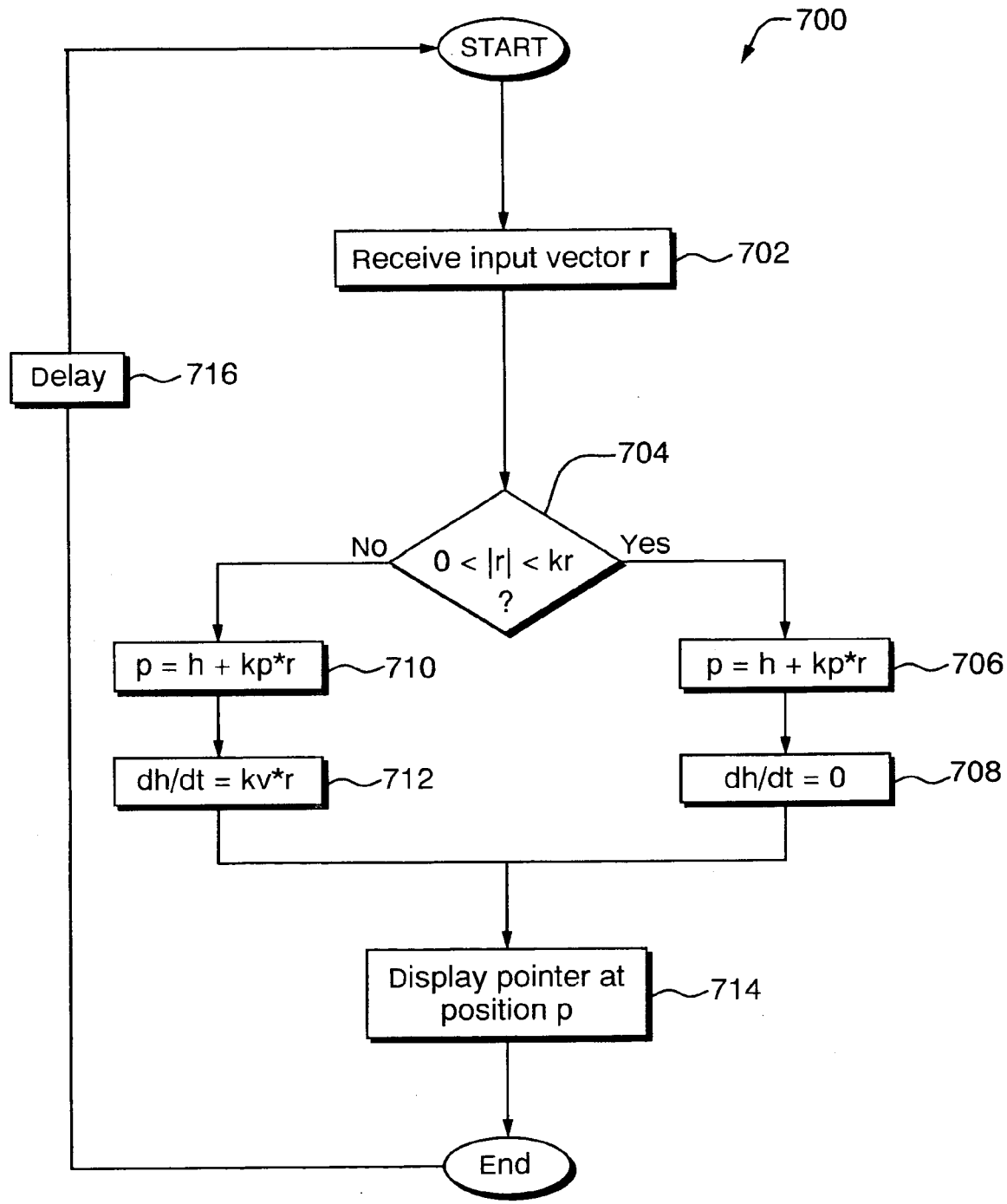
FIG. 7 is a flow chart of a method for moving an on-screen pointer in response to input provided to a pointing device according to the first embodiment of the present invention.

Referring to FIG. 7, a flow chart is shown of a method 700 that may be used to move an on-screen pointer in response to input provided to the pointing device 400 to produce the behavior described above with respect to FIG. 5. The method 700 may, for example, be performed by driver software associated with the pointing device 400 and which executes on a computing device that receives input from the pointing device 400. The method 700 may be executed repeatedly at intervals that are imperceptibly short, such as 10 milliseconds.

The method 700 receives the input vector r (step 702). The method 700 determines whether $0<|r|<kr$ (step 704). If $0<|r|<kr$, then the endpoint 416a (e.g., the user's finger 412) is within the first region 414a; otherwise the endpoint 416a is within the second region 414b.

If $0<|r|<kr$, the method 700 calculates the current value of the position vector p using Equation 1 (step 706) and calculates the current value of the velocity dh/dt using Equation 2 (step 708). If $kr<|r|$, the method 700 calculates the current value of the position vector p using Equation 3 (step 710) and calculates the current value of the velocity dh/dt using Equation 4 (step 712).

Upon calculating the values of p and dh/dt using either steps 706 and 708 or steps 710 and 712, the method 700 displays the on-screen pointer at the coordinates specified by the position vector p (step 714). The method 700 repeats after an imperceptible delay (step 716), such as 10 milliseconds.

Operation of the pointing device 400 will now be described further with respect to several examples which illustrate the operation of the pointing device 400 in conjunction with the transfer function illustrated in FIG. 5. Referring again to FIG. 4A, an example is illustrated in which the input vector 418a remains constant during a particular time interval. In the following examples the pointing device 400 is described as if it were a trackpad pointing device. This is not, however, a limitation of the present invention. Rather, the same techniques may be applied to other kinds of pointing devices.

For purposes of the following examples, assume that the input vector 418a is generated and held constant when the user places his finger 412 on a single point 416a within the first region 414a and holds the finger 412 stationary at point. 416a. It should be appreciated that the input vector 418a and other input vectors described herein may be generated in response to other user gestures when the pointing device 400 is not a trackpad pointing device.

When the user places his finger 412 on the pointing device's surface, the home vector h is assigned the current coordinates of the on-screen pointer. The input vector 418a (r) represents the position of the finger 412 relative to the center 402 of the pointing device 400.

Because the user's finger 412 is within the first region 414a, the magnitude of the input vector 418a is less than the transition radius 404. The pointing device 400 therefore exhibits the behavior of a positional pointing device. More specifically, the current position p of the pointer and the velocity dh/dt are calculated using Equation 1 and Equation 2, respectively. (FIG. 7, steps 706 and 708). Because the user's finger 412 remains stationary at the contact point 416a in the example illustrated in FIG. 4A, in such a case the on-screen pointer would also remain stationary for the duration of the contact.

Figure 4B:
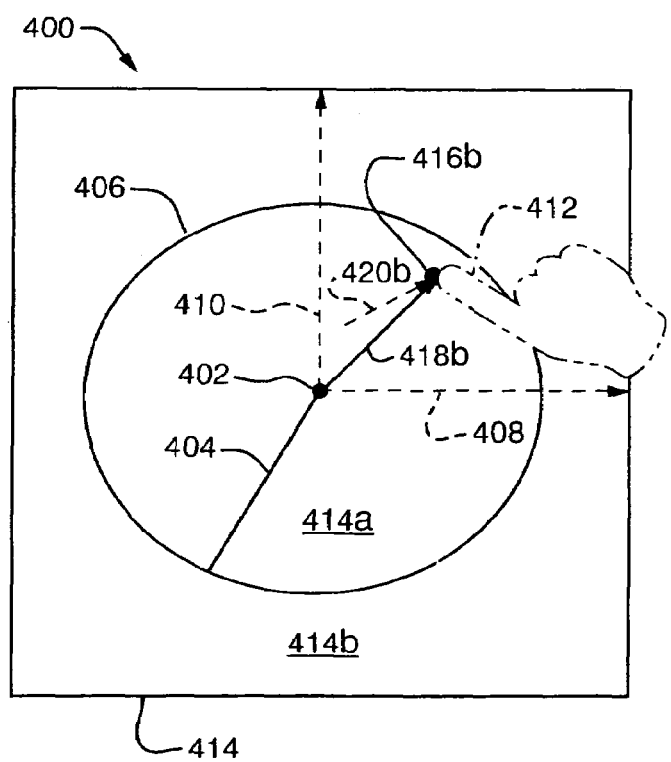
FIG. 4B is a diagram illustrating the surface of the pointing device of FIG. 4A and the movement of the user's finger on the surface solely within the transition radius of the center of the surface according to one embodiment of the present invention.

Referring to FIG. 4B, an example is illustrated in which the user moves his finger 412 on the surface 414 along a trajectory 420a that lies solely within the first region 414a, coming to rest at point 416b. Because the user's finger 412 is within the first region 414a at each point along the trajectory 420a, the pointing device 400 exhibits the behavior of a positional pointing device as the user moves his finger 412 along the trajectory 420a, by calculating the position p and the velocity dh/dt as described above with respect to FIG. 7, steps 706-708. Input vector 418b represents the input vector r when the user's finger 412 is in contact with the surface 414 at point 416b.

Figure 4C:
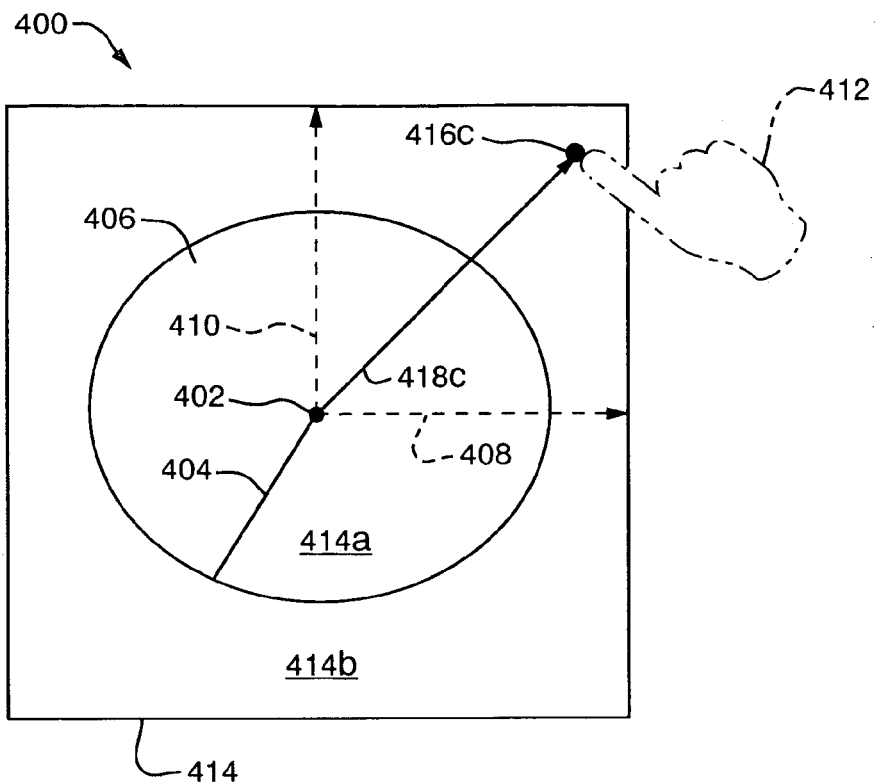
FIG. 4C is a diagram illustrating the surface of the pointing device of FIG. 4A and the contact of the user's finger on the surface outside of the transition radius according to one embodiment of the present invention.

FIG. 4C illustrates an example in which the user places his finger 412 on a single point 416c within the second region 414b and holds the finger 412 stationary. The input vector 418c represents the position of the finger 412 relative to the center 402 of the input coordinate space 414.

Because the user's finger 412 is within the second region 414b, the magnitude of the input vector 418c is greater than the transition radius 404. The pointing device 400 therefore exhibits the behavior of a combined positional- and velocity-based pointing device. More specifically, the current position p of the pointer and the velocity dh/dt are calculated using Equation 3 and Equation 4, respectively (FIG. 7, steps 710 and 712). Because the user's finger 412 remains stationary at the contact point 416c in the example illustrated in FIG. 4C, in such a case the on-screen pointer would move at a constant velocity having a magnitude proportional to the magnitude of the input vector 418c.

Figure 4D:
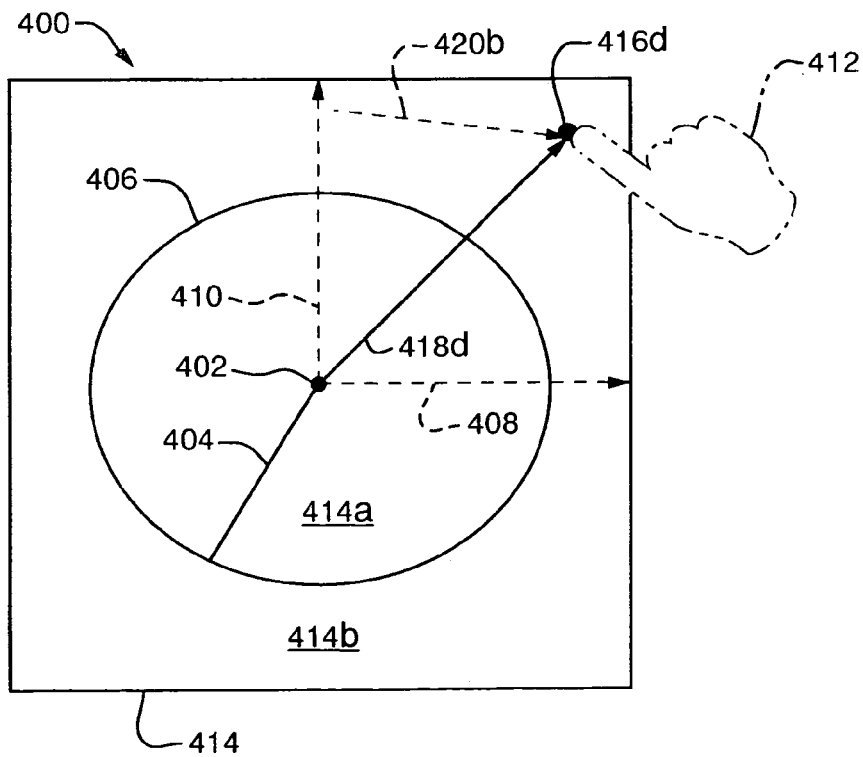
FIG. 4D is a diagram illustrating the surface of the pointing device of FIG. 4A and the movement of the user's finger on the surface solely outside of the transition radius according to one embodiment of the present invention.

Referring to FIG. 4D, an example is illustrated in which the user moves his finger 412 on the surface 414 along a trajectory 420b that lies solely within the second region 414b, coming to rest at point 416d. Because the user's finger is within the second region 414b at each point along the trajectory 420b, the pointing device 400 exhibits the behavior of a blended positional- and velocity-based pointing device as the user moves his finger 412 along the trajectory 420b, by calculating the pointer position p and the velocity dh/dt as described above with respect to FIG. 7, steps 710-12. Input vector 418d represents the input vector r when the user's finger 412 is in contact with the surface 414 at point 416d.

Figure 4E:
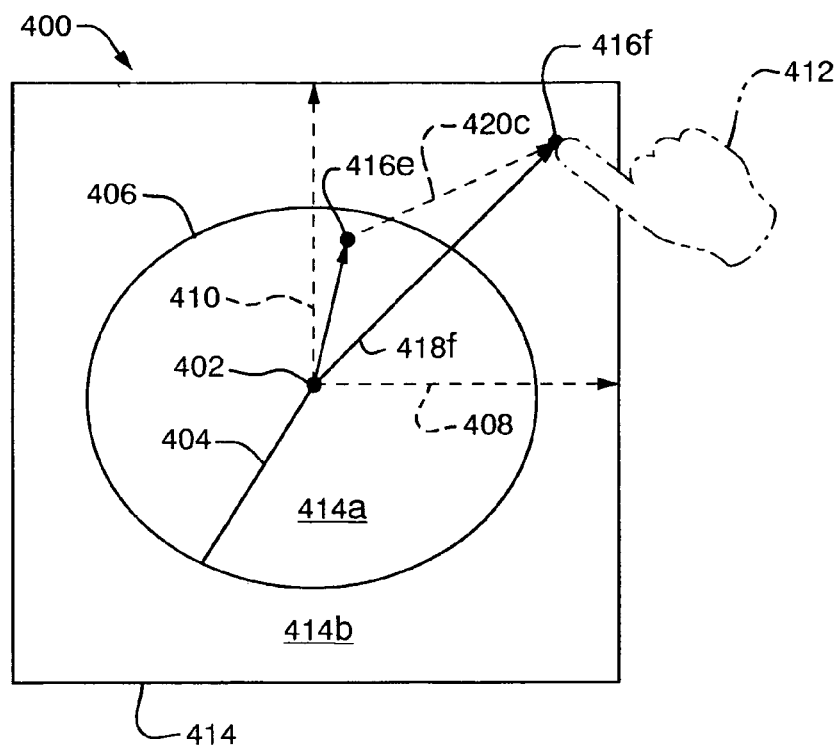
FIG. 4E is a diagram illustrating the surface of the pointing device of FIG. 4A and the movement of the user's finger from a region on the surface within the transition radius to a region on the surface beyond the transition radius according to one embodiment of the present invention.

Referring to FIG. 4E, an example is illustrated in which the user moves his finger 412 within the input coordinate space 414 along a trajectory 420c that lies partially within the first region 414a and partially within the second region 414b. In particular, the user places his finger 412 at starting point 416e and moves it along trajectory 420c to come to rest at ending point 416f. The pointing device 400 exhibits the behavior of a positional pointing device as the user moves his finger 412 along the portion of trajectory 420c that lies within the first region 414a, by calculating the pointer position p and the velocity dh/dt as described above with respect to FIG. 7, steps 706-708. An example input vector 418e is illustrated which represents the input vector r when the user's finger 412 is at starting point 416e.

The pointing device exhibits the behavior of a blended positional- and velocity-based pointing device as the user moves his finger 412 along the portion of trajectory 420c that lies within the second region 414b, by calculating the position p and the velocity dh/dt as described above with respect to FIG. 7, steps 710-712. An example input vector 418f is illustrated which represents the input vector r when the user's finger 412 is at ending point 416f.

Figure 8:
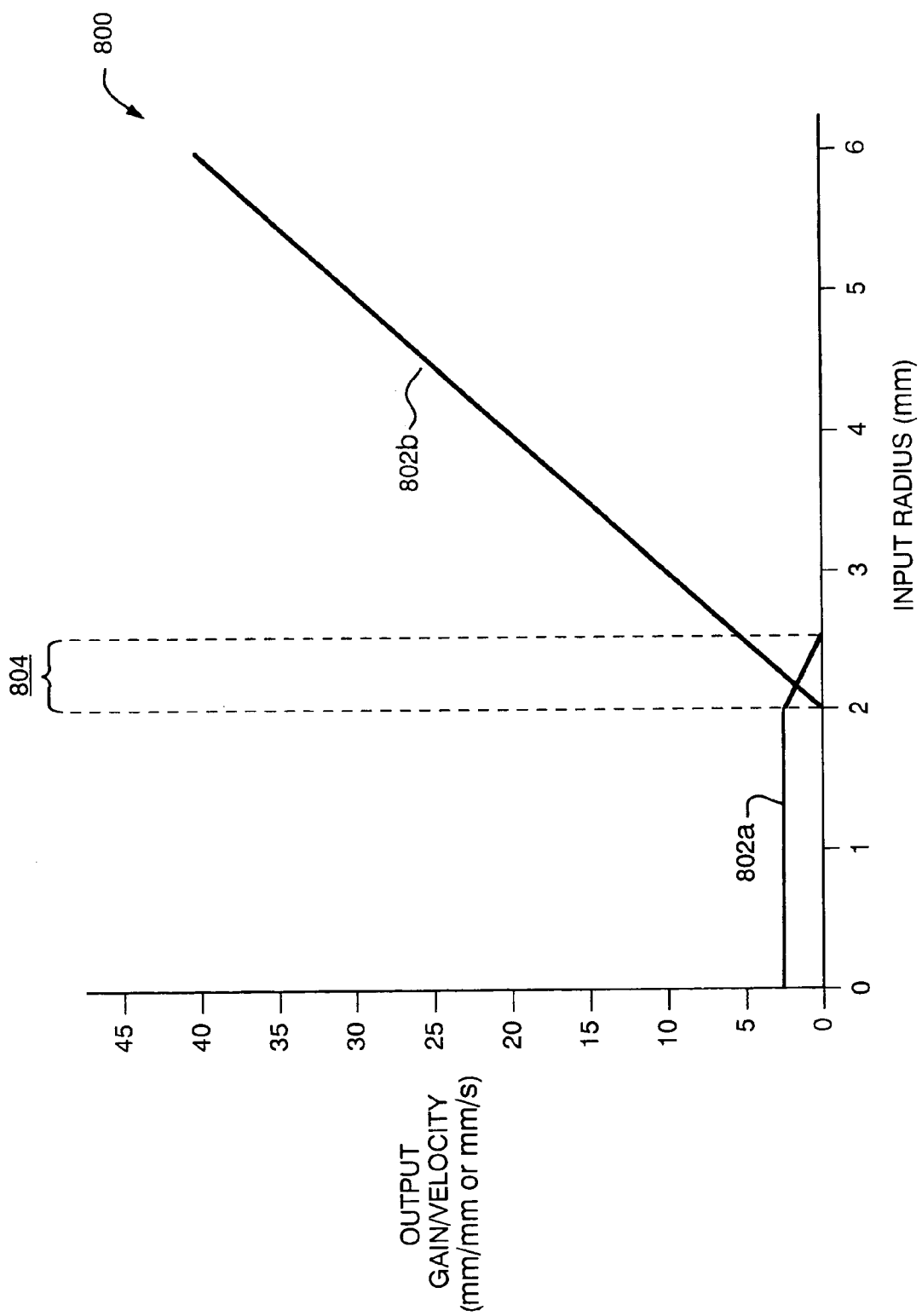
FIG. 8 is a graph of a second blended positional and velocity-based transfer function according to a second embodiment of the present invention, expressed in terms of the relationship between input radius and output velocity.

Referring to FIG. 8, a graph 800 is shown of a transfer function according to a second embodiment of the present invention. The graph 800 is the same as the graph 500 illustrated in FIG. 5 except for certain differences which will now be described.

When the pointing device 400 is used in conjunction with the transfer function illustrated in FIG. 8, the values of p and dh/dt are given by and Equation 1 and Equation 2, respectively, when 0<|r|<kr (e.g., when the user's finger 412 is within the first region 414a). This is the same as described above with respect to the transfer function illustrated in FIG. 5.

Figure 4F:
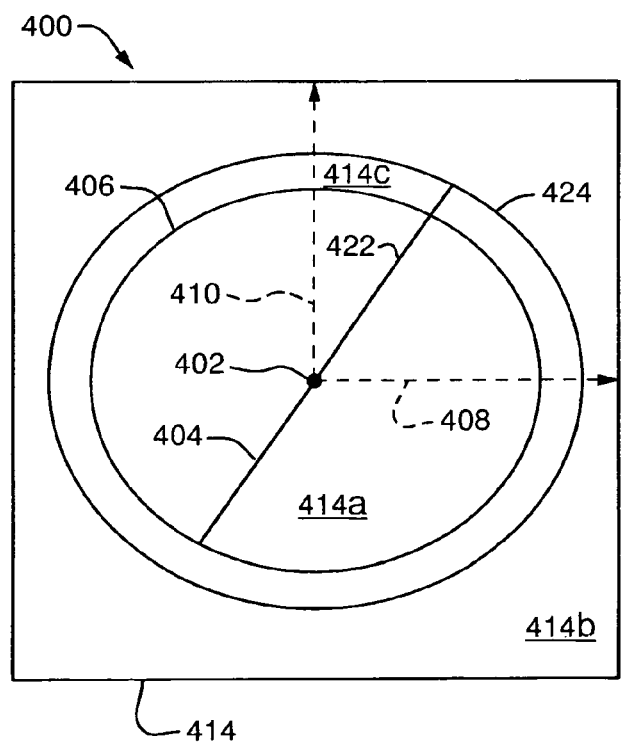
FIG. 4F is a diagram illustrating the surface of the pointing device of FIG. 4A with a third region of movement.

Referring now to FIG. 4F, the input coordinate space 414 may include a third region 414c bounded by a circle 424 having a radius 422, referred to herein by the variable name kr2. The region 414c lies between circles 406 and 424. When the pointing device 400 is used in conjunction with the transfer function illustrated in FIG. 8, the values of p and dh/dt are given by Equation 6 and Equation 7, respectively, when kr<|r|<kr2 (e.g., when the user's finger 412 is within the third region 414c):

$$p = h + \frac{kr2 - |r|}{kr2 - kr} kp * r \quad \text{Equation 6}$$

$$dh/dt = kv * r \quad \text{Equation 7}$$

Equation 6 and Equation 7, above, may be combined to form Equation 8, which gives the position p for kr<|r|<kr2 when the transfer function illustrated in FIG. 8 is used:

$$p = \int kv * r * dt + \frac{kr2 - |r|}{kr2 - kr} kp * r \quad \text{Equation 8}$$

This behavior is illustrated by the graph 800 in FIG. 8. The component 802b in FIG. 8, for example, is the same as the component 502b in FIG. 5, and both components 502b and 802b are governed by corresponding equations Equation 4 and Equation 7, respectively. Component 802a is represented by the ((kr2−|r|)/(kr2−kr))kp*r term in Equation 8.

When the pointing device 400 is used in conjunction with the transfer function illustrated in FIG. 8, the values of p and dh/dt are given by Equation 9 and Equation 10, respectively, when kr2<|r| (e.g., when the user's finger 412 is within the second region 414b):

$$p = h \quad \text{Equation 9}$$

$$dh/dt = kv * r \quad \text{Equation 10}$$

Equation 9 and Equation 10, above, may be combined to form Equation 11, which gives the position p for kr2<|r| when the transfer function illustrated in FIG. 8 is used:

$$p = \int kv * r * dt \qquad \text{Equation 11}$$

This behavior is illustrated by the graph 800 in FIG. 8 The component 802b in FIG. 8, for example, is the same as the component 502b in FIG. 5, and both components 502b and 802b are governed by corresponding equations Equation 4 and Equation 10, respectively. The zero value of component 802a within the region where kr2<|r| is represented by Equation 9.

Figure 9:
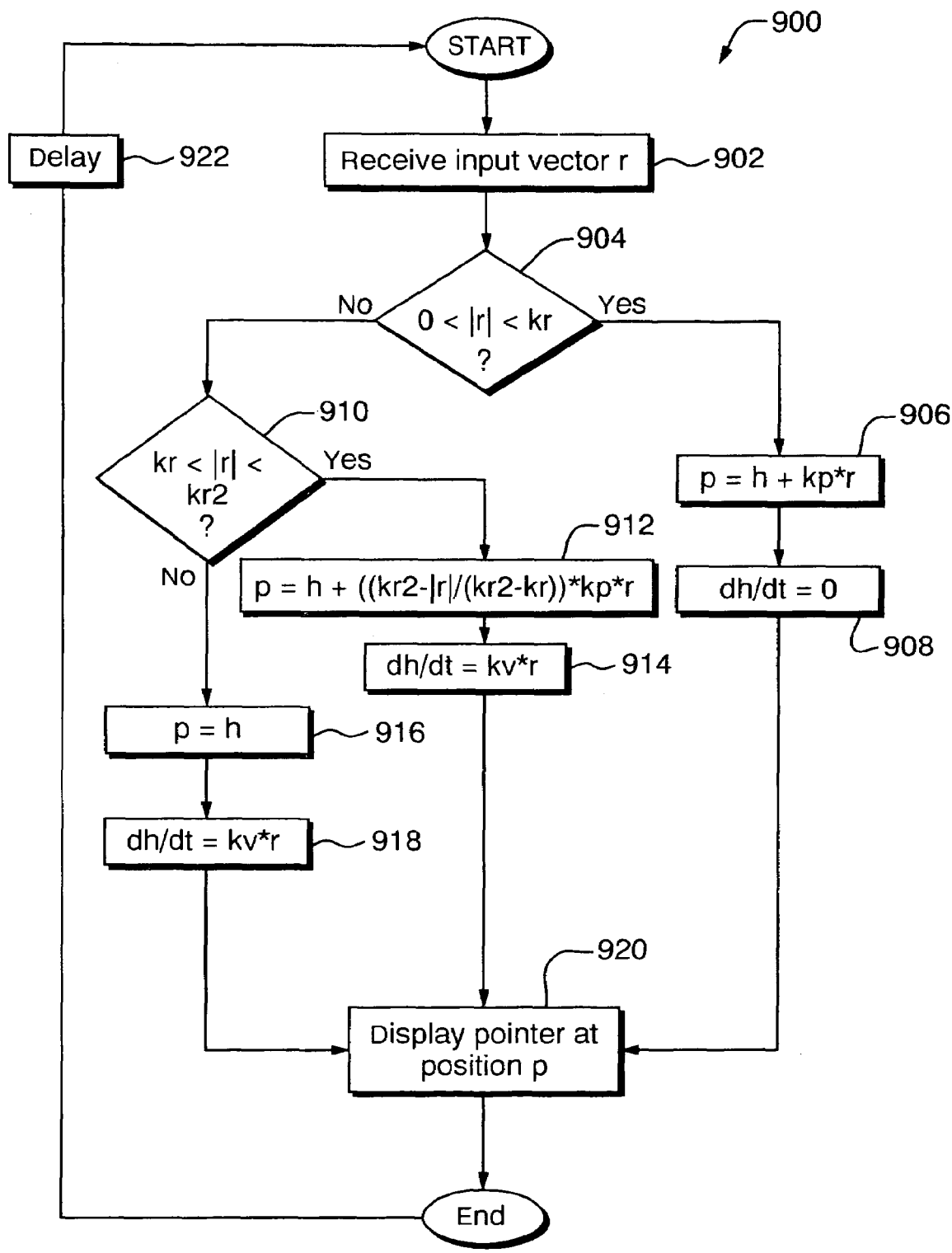
FIG. 9 is a flow chart of a method for moving an on-screen pointer in response to input provided to a pointing device according to the second embodiment of the present invention.

Referring to FIG. 9, a flow chart is shown of a method 900 that may be used to move an on-screen pointer in response to input provided to the pointing device 400 to produce the behavior described above with respect to FIG. 8. The method 900 may, for example, be performed by driver software associated with the pointing device 400 and which executes on a computing device that receives input from the pointing device 400. The method 900 may be executed repeatedly at intervals that are imperceptibly short, such as 10 milliseconds.

The method 900 receives the input vector r (step 902). The method 900 determines whether 0<|r|<kr (step 904). If 0<|r|<kr, then the user's finger 412 is within the first region 414a. In this case, the method 900 calculates the current value of the position vector p using Equation 1 (step 906) and calculates the current value of the velocity dh/dt using Equation 2 (step 908).

If kr<|r|<kr2 (step 910), the method 900 calculates the current value of the position vector p using Equation 6 (step 912) and calculates the current value of the velocity dh/dt using Equation 7 (step 914).

If kr2<|r| (step 910), the method 900 calculates the current value of the position vector p using Equation 9 (step 916) and calculates the current value of the velocity dh/dt using Equation 10 (step 918).

Upon calculating the values of p and dh/dt, the method 900 displays the on-screen pointer at the coordinates specified by the position vector p (step 920). The method 900 repeats after an imperceptible delay (step 922), such as 10 milliseconds.

Among the advantages of the invention are one or more of the following.

One advantage of various embodiments of the present invention is that they provide transfer functions that are particularly well-suited for use with pointing devices that have a range of motion that is intermediate between the ranges of motion of conventional trackpads and conventional TrackPoint pointing devices. Examples of pointing devices having such intermediate ranges of motion are described elsewhere herein. Because such pointing devices have ranges of motion that are intermediate between the ranges of motion of conventional positional and velocity-based pointing devices, it is advantageous to provide such devices with transfer functions, such as the transfer function disclosed herein with respect to FIG. 5, which combine features of the transfer functions associated with such conventional pointing devices.

As described above, the first component 502a of the transfer function illustrated in FIG. 5 exhibits the behavior of a purely positional transfer function, while the second component 502b exhibits the behavior of both a positional and a velocity-based transfer function. Such a transfer function provides the user with added flexibility in comparison with purely positional or purely velocity-based transfer functions. In particular, the user may use the pointing device 400 as a purely positional pointing device, by moving his finger 412 solely within the first region 414a, when fine-grained control over the coordinates of the pointing device is desired. The user may use the pointing device 400 as a blended positional and velocity-based pointing device when rapid movement of the pointer is desired. Providing the user with the ability to use the pointing device 400 in either of these two modes merely by positioning his finger 412 within different regions of the pointing device 400 provides the user with a greater degree of control over the pointer and a greater degree of flexibility in choosing how to control the position and velocity of the pointer than is provided by conventional pointing devices.

In particular, the transfer function described above with respect to FIG. 5 allows the user to control the velocity of the pointer by operating the pointing device 400 closer or further away from the center 402 of the input coordinate space 414. The pointing device 400 is "operated" closer to the center 402 by producing shorter input vectors, while the pointing device 400 is "operated" further away from the center 402 by producing longer input vectors. A trackpad, for example, is "operated" closer to its center by contacting the surface of the trackpad closer to its center, while a TrackPoint pointing device is "operated" closer to its center by applying less force to it.

The pointing device 400, therefore, is not limited to moving the pointer at a fixed velocity, as is the case with prior art pointing device 300. The user may therefore use the pointing device 400 as both a positional pointing device and as a velocity-based pointing device having a variable velocity that may be controlled easily and intuitively by the user. This further increases the range of pointer control options available to the user and thereby provides the user with a greater degree of pointer control flexibility compared to conventional pointing devices.

A further advantage of various embodiments of the present invention is that they may be implemented in conjunction with pointing devices that are smaller than purely positional pointing devices. This advantage may be particularly important for pointing devices that are used in portable computing devices such as laptop computers and PDAs.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Although the various embodiments described herein employ a constant velocity, this is not a requirement of the present invention. Some conventional pointing devices, for example, include an "acceleration" feature according to which a faster movement of the pointing device causes the on-screen pointer to move at a faster velocity than it would move absent the acceleration feature. Those of ordinary skill in the art will appreciate how to implement such a feature in conjunction with the techniques disclosed herein.

The particular constant values described herein, such as the values for the positional gain kp, the velocity gain kv, and the transition radii kr and kr2, are provided merely for purposes of example and do not constitute limitations of the present invention.

Although the regions 414a and 414c illustrated in FIGS. 4A-4F are circular, this is not a requirement of the present invention. Rather, such regions may be of any shape. For example, they may be square or rectangular. Furthermore, the regions 414a-c need not represent regions of a surface on a trackpad pointing device, but rather may represent more generally regions in an input coordinate space of any of various kinds of pointing devices.

What is claimed is:

1. A computer-implemented method for use with a pointing device for providing input to a computing device, the method comprising steps of:
   (A) receiving an input vector representing input coordinates relative to a center of an input coordinate space associated with the pointing device, the input coordinate space comprising a first region and a second region;
   (B) determining whether the input coordinates are within the first region of the input coordinate space;
   (C) selecting a first transfer function if the input coordinates are determined to be within the first region;
   (D) selecting a second transfer function if the input coordinates are determined not to be within the first region, the second transfer function comprising a non-constant function relating the input vector to velocity; and
   (E) selecting a position and velocity of an on-screen pointer based on the selected transfer function.

2. The method of claim 1, wherein the first transfer function relates the position p of the on-screen pointer to the input vector r using the formula:

$p=h+kp*r,$ wherein h comprises a vector representing a center of a positional range of the pointer, wherein kp comprises a positional gain, and wherein the first transfer function relates the velocity dh/dt of the center of the positional range of the pointer to the input vector r using the formula:

$dh/dt=0.$

3. The method of claim 2, wherein the positional gain kp comprises a value of about two millimeters per millimeter.

4. The method of claim 2, further comprising steps of:
   (F) identifying coordinates of the on-screen pointer upon commencement of a pointing operation; and
   (G) setting the coordinates of the home vector h equal to the coordinates identified in step (F).

5. The method of claim 2, wherein the positional gain kp comprises a value of about two millimeters per millimeter.

6. The method of claim 1, wherein the second transfer function relates the position p of the on-screen pointer to the input vector r using the formula:

$p=h+kp*r,$ wherein h comprises a vector representing a center of a positional range of the pointer, wherein kp comprises a positional gain, and wherein the second transfer function relates the velocity dh/dt of the on-screen pointer to the input vector r using the formula:

$dh/dt=kv*r,$ wherein kv comprises a velocity gain.

7. The method of claim 5, wherein the velocity gain kv comprises a value of about ten per second.

8. The method of claim 5, further comprising steps of:
   (F) identifying coordinates of the on-screen pointer upon commencement of a pointing operation; and
   (G) setting the coordinates of the home vector h equal to the coordinates identified in step (F).

9. The method of claim 1, wherein the step (B) comprises steps of:
   (B) (1) identifying a distance between the input coordinates and the center of the input coordinate space;
   (B) (2) determining whether the distance is less than a transition radius;
   (B) (3) determining that the input coordinates are within the first region if the distance is determined to be less than the transition radius; and
   (B) (4) determining that the input coordinates are not within the first region otherwise.

10. The method of claim 9, wherein the transition radius comprises a value within a range of about two millimeters to about six millimeters.

11. The method of claim 1, wherein the input coordinate space further comprises a third region, and wherein the step (D) comprises steps of:
    (D) (1) determining whether the input coordinates are within the second region;
    (D) (2) selecting the second transfer function if the input coordinates are determined to be within the second region; and
    (D) (3) selecting a third transfer function if the input coordinates are determined not to be within the second region.

12. The method of claim 11, wherein the first transfer function relates the position p of the on-screen pointer to the input vector r using the formula:

$p=h+kp*r,$ wherein h comprises a vector representing a center of a positional range of the pointer, and wherein kp comprises a positional gain, and wherein the first transfer function relates the velocity dh/dt of the center of the positional range of the pointer to the input vector r using the formula:

$dh/dt=0.$

13. The method of claim 11, wherein the third transfer function relates the position p of the on-screen pointer to the input vector r using the formula:

$p=h,$ wherein h comprises a vector representing a center of a positional range of the pointer, and wherein the first transfer function relates the velocity dh/dt of the on-screen pointer to the input vector r using the formula:

$dh/dt=kv*r,$ wherein kv comprises a velocity gain.

14. The method of claim 1, wherein the second transfer function relates the position p of the on-screen pointer to the input vector r using the formula:

$p=h+((kr2-|r|)/(kr2-kr))*kp*r,$ wherein h comprises a vector representing a center of a positional range of the pointer, wherein kp comprises a positional gain, wherein kr comprises a first transition radius, wherein kr2 comprises a second transition radius, and wherein the first transfer function relates the velocity dh/dt of the on-screen pointer to the input vector r using the formula:

$dh/dt=kv*r,$ wherein kv comprises a velocity gain.

15. The method of claim 1, wherein the first region comprises a region bounded by a rectangle.

16. An apparatus for use with a pointing device for providing input to a computing device, the apparatus comprising:
reception means for receiving an input vector representing input coordinates relative to a center of an input coordinate space associated with the pointing device, the input coordinate space comprising a first region and a second region;
determination means for determining whether the input coordinates are within the first region of the input coordinate space;
first selection means for selecting a first transfer function if the input coordinates are determined to be within the first region;
second selection means for selecting a second transfer function if the input coordinates are determined not to be within the first region, the second transfer function comprising a non-constant function relating the input vector to velocity; and
third selection means for selecting a position and velocity of an on-screen pointer based on the selected transfer function.

17. The apparatus of claim 16, wherein the first transfer function relates the position p of the on-screen pointer to the input vector r using the formula:

$p=h+kp*r$;

wherein h comprises a vector representing a center of a positional range of the pointer, wherein kp comprises a positional gain, and wherein the first transfer function relates the velocity dh/dt of the center of the positional range of the pointer to the input vector r using the formula:

$dh/dt=0$.

18. The apparatus of claim 17, wherein the positional gain kp comprises a value of about two millimeters per millimeter.

19. The apparatus of claim 17, further comprising:
means for identifying coordinates of the on-screen pointer upon commencement of a pointing operation; and
means for setting the coordinates of the home vector h equal to the coordinates identified by the means for identifying.

20. The apparatus of claim 17, wherein the positional gain kp comprises a value of about two millimeters per millimeter.

21. The apparatus of claim 16, wherein the second transfer function relates the position p of the on-screen pointer to the input vector r using the formula:

$p=h+kp*r$;

wherein h comprises a vector representing a center of a positional range of the pointer, wherein kp comprises a positional gain, and wherein the second transfer function relates the velocity dh/dt of the on-screen pointer to the input vector r using the formula:

$dh/dt=kv*r$;

wherein kv comprises a velocity gain.

22. The apparatus of claim 21, wherein the velocity gain kv comprises a value of about ten per second.

23. The apparatus of claim 21, further comprising:
means for identifying coordinates of the on-screen pointer upon commencement of a pointing operation; and
means for setting the coordinates of the home vector h equal to the coordinates identified in step (F).

24. The apparatus of claim 16, wherein the determination means comprises:
means for identifying a distance between the input coordinates and the center of the input coordinate space;
means for determining whether the distance is less than a transition radius;
means for determining that the input coordinates are within the first region if the distance is determined to be less than the transition radius; and
means for determining that the input coordinates are not within the first region otherwise.

25. The apparatus of claim 24, wherein the transition radius comprises a value within a range of about two millimeters to about six millimeters.

26. The apparatus of claim 16, wherein the input coordinate space further comprises a third region, and wherein the second selection means comprises:
means for determining whether the input coordinates are within the second region;
means for selecting the second transfer function if the input coordinates are determined to be within the second region; and
means for selecting a third transfer function if the input coordinates are determined not to be within the second region.

27. The apparatus of claim 26, wherein the first transfer function relates the position p of the on-screen pointer to the input vector r using the formula:

$p=h+kp*r$;

wherein h comprises a vector representing a center of a positional range of the pointer, and wherein kp comprises a positional gain, and wherein the first transfer function relates the velocity dh/dt of the center of the positional range of the pointer to the input vector r using the formula:

$dh/dt=0$.

28. The apparatus of claim 26, wherein the third transfer function relates the position p of the on-screen pointer to the input vector r using the formula:

$p=h$, wherein h comprises a vector representing a center of a positional range of the pointer, and wherein the first transfer function relates the velocity dh/dt of the on-screen pointer to the input vector r using the formula:

$dh/dt=kv*r$;

wherein kv comprises a velocity gain.

29. The apparatus of claim 16, wherein the second transfer function relates the position p of the on-screen pointer to the input vector r using the formula:

$p=h+((kr2-|r|)/(kr2-kr))*kp*r$;

wherein h comprises a vector representing a center of a positional range of the pointer, wherein kp comprises a positional gain, wherein kr comprises a first transition radius, wherein kr2 comprises a second transition radius, and wherein the first transfer function relates the velocity dh/dt of the on-screen pointer to the input vector r using the formula:

$dh/dt=kv*r$;

wherein kv comprises a velocity gain.

30. The apparatus of claim 16, wherein the first region comprises a region bounded by a rectangle.

31. A computer-implemented method for use with a pointing device for providing input to a computing device, the method comprising steps of:
(A) receiving an input vector representing input coordinates relative to a center of an input coordinate space associated with the pointing device;
(B) determining whether the input coordinates are within a first transition radius of the center of the input coordinate space;
(C) selecting a first transfer function if the input coordinates are determined to be within the first transition radius of the center of the input coordinate space;
(D) selecting a second transfer function if the input coordinates are determined not to be within the first transition radius of the center of the input coordinate space; and
(E) selecting a position and velocity of an on-screen pointer based on the selected transfer function.

32. The method of claim 31, wherein the first transfer function relates the position p of the on-screen pointer to the input vector r using the formula:

$$p=h+kp*r,$$

wherein h comprises a vector representing a center of a positional range of the pointer, and wherein kp comprises a positional gain, and wherein the first transfer function relates the velocity dh/dt of the on-screen pointer to the input vector r using the formula:

$$dh/dt=0.$$

33. The method of claim 32, wherein the positional gain kp comprises a value of about two millimeters per millimeter.

34. The method of claim 32, wherein the positional gain kp comprises a value of about two millimeters per millimeter.

35. The method of claim 31, wherein the second transfer function relates the position p of the on-screen pointer to the input vector r using the formula:

$$p=h+kp*r,$$

wherein h comprises a vector representing a center of a positional range of the pointer, wherein kp comprises a positional gain, and wherein the second transfer function relates the velocity dh/dt of the on-screen pointer to the input vector r using the formula:

$$dh/dt=kv*r,$$

wherein kv comprises a velocity gain.

36. The method of claim 34, wherein the velocity gain kv comprises a value of about ten per second.

37. The method of claim 31, further comprising steps of:
(F) obtaining coordinates of an initial input point in the input coordinate space; and
(G) setting the coordinates of the home vector h equal to the input coordinates obtained in-step (F).

38. The method of claim 31, wherein the first transition radius comprises a value within a range of about two millimeters to about six millimeters.

39. The method of claim 31, wherein the step (D) comprises steps of:
(D) (1) determining whether the input coordinates are within a second transition radius of the center of the input coordinate space, wherein the second transition radius is greater than the first transition radius;
(D) (2) selecting the second transfer function if the input coordinates are determined to be within the second transition radius of the center of the input coordinate space; and
(D) (3) selecting a third transfer function if the input coordinates are determined not to be within the second transition radius of the input coordinate space.

40. The method of claim 39, wherein the first transfer function relates the position p of the on-screen pointer to the input vector r using the formula:

$$p=h+kp*r,$$

wherein h comprises a vector representing a center of a positional range of the pointer, and wherein kp comprises a positional gain, and wherein the first transfer function relates the velocity dh/dt of the on-screen pointer to the input vector r using the formula:

$$dh/dt=0.$$

41. The method of claim 39, wherein the third transfer function relates the position p of the on-screen pointer to the input vector r using the formula:

$$p=h,$$

wherein h comprises a vector representing a center of a positional range of the pointer, and wherein the first transfer function relates the velocity dh/dt of the on-screen pointer to the input vector r using the formula:

$$dh/dt=kv*r,$$

wherein kv comprises a velocity gain.

42. The method of claim 31, wherein the second transfer function relates the position p of the on-screen pointer to the input vector r using the formula:

$$p=h+((kr2-|r|)/(kr2-kr))*kp*r,$$

wherein h comprises a vector representing a center of a positional range of the pointer, wherein kp comprises a positional gain, wherein kr comprises the first transition radius, wherein kr2 comprises the second transition radius, and wherein the first transfer function relates the velocity dh/dt of the on-screen pointer to the input vector r using the formula:

$$dh/dt=kv*r,$$

wherein kv comprises a velocity gain.

43. An apparatus for use with a pointing device for providing input to a computing device, the apparatus comprising:
reception means for receiving an input vector representing input coordinates relative to a center of an input coordinate space associated with the pointing device;
determination means for determining whether the input coordinates are within a first transition radius of the center of the input coordinate space;
first selection means for selecting a first transfer function if the input coordinates are determined to be within the first transition radius of the center of the input coordinate space;
second selection means for selecting a second transfer function if the input coordinates are determined not to be within the first transition radius of the center of the input coordinate space; and
third selection means for selecting a position and velocity of an on-screen pointer based on the selected transfer function.

44. The apparatus of claim 43, wherein the first transfer function relates the position p of the on-screen pointer to the input vector r using the formula:

$$p=h+kp*r;$$

wherein h comprises a vector representing a center of a positional range of the pointer, and wherein kp comprises a positional gain, and wherein the first transfer function relates the velocity dh/dt of the on-screen pointer to the input vector r using the formula:

$$dh/dt=0.$$

45. The apparatus of claim 44, wherein the positional gain kp comprises a value of about two millimeters per millimeter.

46. The apparatus of claim 44, wherein the positional gain kp comprises a value of about two millimeters per millimeter.

47. The apparatus of claim 43, wherein the second transfer function relates the position p of the on-screen pointer to the input vector r using the formula:

$$p=h+kp*r;$$

wherein h comprises a vector representing a center of a positional range of the pointer, wherein kp comprises a positional gain, and wherein the second transfer function relates the velocity dh/dt of the on-screen pointer to the input vector r using the formula:

$$dh/dt=kv*r;$$

wherein kv comprises a velocity gain.

48. The apparatus of claim 47, wherein the velocity gain kv comprises a value of about ten per second.

49. The apparatus of claim 43, further comprising:
means for obtaining coordinates of an initial input point in the input coordinate space; and
means for setting the coordinates of the home vector h equal to the input coordinates obtained in step (F).

50. The apparatus of claim 43, wherein the first transition radius comprises a value within a range of about two millimeters to about six millimeters.

51. The apparatus of claim 43, wherein the second selection means comprises:
means for determining whether the input coordinates are within a second transition radius of the center of the input coordinate space, wherein the second transition radius is greater than the first transition radius;
means for selecting the second transfer function if the input coordinates are determined to be within the second transition radius of the center of the input coordinate space; and
means for selecting a third transfer function if the input coordinates are determined not to be within the second transition radius of the input coordinate space.

52. The apparatus of claim 51, wherein the first transfer function relates the position p of the on-screen pointer to the input vector r using the formula:

$$p=h+kp*r;$$

wherein h comprises a vector representing a center of a positional range of the pointer, and wherein kp comprises a positional gain, and wherein the first transfer function relates the velocity dh/dt of the on-screen pointer to the input vector r using the formula:

$$dh/dt=0.$$

53. The apparatus of claim 51, wherein the third transfer function relates the position p of the on-screen pointer to the input vector r using the formula:

$$p=h,$$

wherein h comprises a vector representing a center of a positional range of the pointer, and wherein the first transfer function relates the velocity dh/dt of the on-screen pointer to the input vector r using the formula:

$$dh/dt=kv*r;$$

wherein kv comprises a velocity gain.

54. The apparatus of claim 43, wherein the second transfer function relates the position p of the on-screen pointer to the input vector r using the formula:

$$p=h+((kr2|r|)/(kr2-kr))*kp*r;$$

wherein h comprises a vector representing a center of a positional range of the pointer, wherein kp comprises a positional gain, wherein kr comprises the first transition radius, wherein kr2 comprises the second transition radius, and wherein the first transfer function relates the velocity dh/dt of the on-screen pointer to the input vector r using the formula:

$$dh/dt=kv*r;$$

wherein kv comprises a velocity gain.

* * * * *